US012069391B2

(12) United States Patent
Suess et al.

(10) Patent No.: US 12,069,391 B2
(45) Date of Patent: Aug. 20, 2024

(54) READOUT ARCHITECTURES FOR DARK CURRENT REDUCTION IN INDIRECT TIME-OF-FLIGHT SENSORS

(71) Applicant: OMNIVISION TECHNOLOGIES, INC., Santa Clara, CA (US)

(72) Inventors: Andreas Suess, San Jose, CA (US); Zheng Yang, San Jose, CA (US)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 199 days.

(21) Appl. No.: 17/388,820

(22) Filed: Jul. 29, 2021

(65) Prior Publication Data

US 2023/0035088 A1    Feb. 2, 2023

(51) Int. Cl.
| | |
|---|---|
| H04N 25/771 | (2023.01) |
| G01S 7/4865 | (2020.01) |
| G01S 17/894 | (2020.01) |
| H04N 25/705 | (2023.01) |
| H04N 25/75 | (2023.01) |

(52) U.S. Cl.
CPC ......... H04N 25/771 (2023.01); G01S 7/4865 (2013.01); G01S 17/894 (2020.01); H04N 25/705 (2023.01); H04N 25/75 (2023.01)

(58) Field of Classification Search
CPC .... H04N 25/771; H04N 25/705; H04N 25/78; H04N 25/77; H04N 25/745; H04N 25/7795; G01S 17/894; G01S 7/4865
See application file for complete search history.

(56) References Cited

U.S. PATENT DOCUMENTS

| | | | | |
|---|---|---|---|---|
| 8,344,306 | B2 * | 1/2013 | Kim | H04N 25/00 348/46 |
| 2010/0020209 | A1 * | 1/2010 | Kim | H04N 25/00 348/E5.022 |
| 2014/0375855 | A1 * | 12/2014 | Nishihara | H01L 27/14603 348/301 |
| 2015/0163438 | A1 * | 6/2015 | Anjyou | H04N 25/75 250/208.1 |

(Continued)

OTHER PUBLICATIONS

Chen, C.L., et al., "An Up-to-1400nm 500MHz Demodulated Time-of-Flight Image Sensor on a Ge-on-Si Platform," 2020 IEEE International Solid-State Circuits Conference, San Francisco, Feb. 16-20, 2020, 17 pages.

*Primary Examiner* — John W Miller
*Assistant Examiner* — Sean N. Haiem
(74) *Attorney, Agent, or Firm* — PERKINS COIE LLP

(57) ABSTRACT

A pixel circuit includes a photodiode configured to photo-generate charge in response to reflected modulated light incident upon the photodiode. A first floating diffusion is configured to store a first portion of charge photogenerated in the photodiode. A first transfer transistor is configured to transfer the first portion of charge from the photodiode to the first floating diffusion in response to a first phase signal. A first storage node is configured to store the first portion of charge from the first floating diffusion. A first decoupling circuit has a first output responsive to a first input. The first input is coupled to the first floating diffusion and the first output is coupled to first storage node. A voltage swing at the first output is greater than a voltage swing at the first input.

27 Claims, 8 Drawing Sheets

(56) References Cited

U.S. PATENT DOCUMENTS

| | | | |
|---|---|---|---|
| 2017/0234985 A1* | 8/2017 | Kadambi | G01S 17/894 |
| | | | 702/152 |
| 2018/0176497 A1* | 6/2018 | Saha | H04N 25/75 |
| 2019/0081095 A1* | 3/2019 | Hanzawa | H01L 27/14831 |
| 2020/0204748 A1* | 6/2020 | Genov | H04N 25/77 |
| 2020/0260026 A1* | 8/2020 | Ono | H04N 25/59 |

* cited by examiner

READOUT ARCHITECTURES FOR DARK CURRENT REDUCTION IN INDIRECT TIME-OF-FLIGHT SENSORS

BACKGROUND INFORMATION

Field of the Disclosure

This disclosure relates generally to image sensors, and in particular but not exclusively, relates to time of flight image sensors.

Background

Interest in three dimensional (3D) cameras is increasing as the popularity of 3D applications continues to grow in areas such as imaging, movies, games, computers, user interfaces, facial recognition, object recognition, augmented reality, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the 3D images. In addition, this technique is complex and therefore requires significant computer processing power in order to create the 3D images in real time.

For applications that require the acquisition of 3D images in real time, active depth imaging systems based on time of flight measurements are sometimes utilized. Time of flight cameras typically employ a light source that directs light at an object, a sensor that detects the light that is reflected from the object, and a processing unit that calculates the distance to the object based on the round-trip time it takes for the light to travel to and from the object.

A continuing challenge with the acquisition of 3D images is distinguishing signals generated in response to reflected light from objects from the undesired background signals from ambient light as well as the accumulated dark current in the sensors. It has also become a tremendous challenge for outdoor operation as non-silicon based devices, such as SiGe, Ge, InGaAs, InP, GaAs, etc., based devices, exhibit significantly higher dark current. Another challenge with the acquisition of 3D images is the power consumed by the pixel array sensors. One of the key contributors of power consumption in indirect time-of-flight sensors is long exposure times associated demodulation signaling in the pixel arrays of the 3D sensors.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
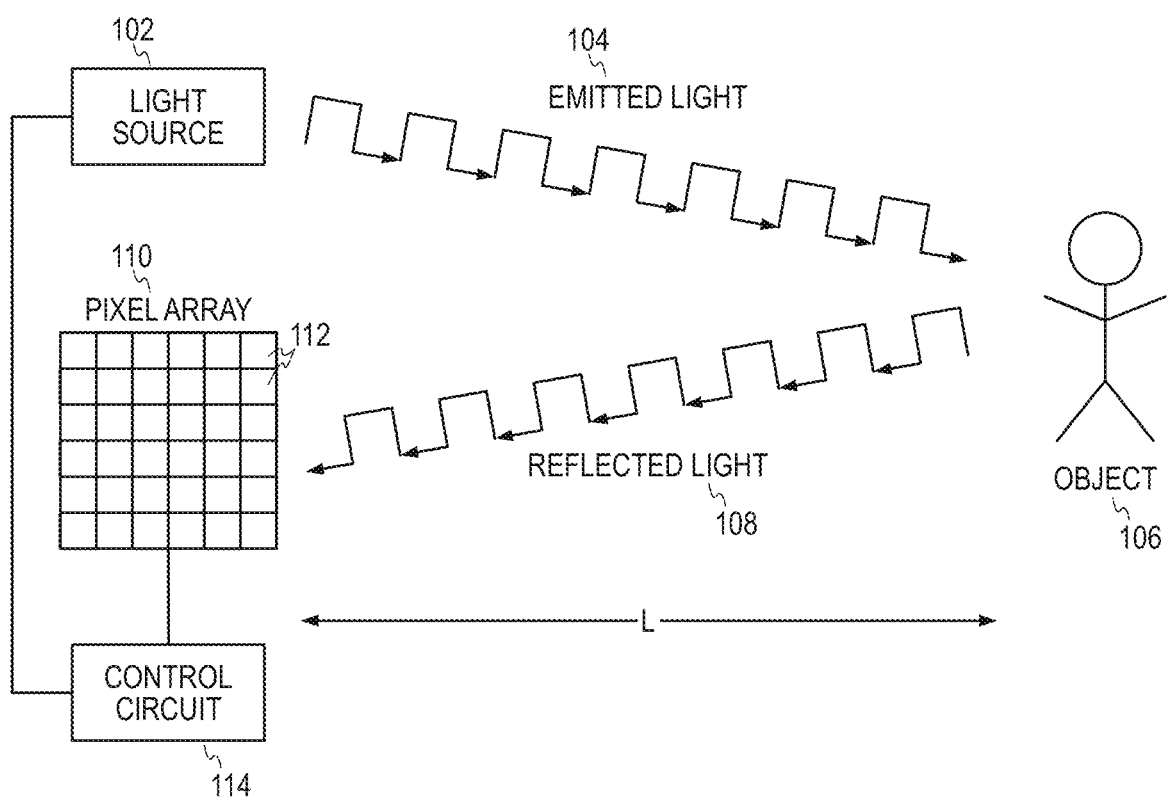
FIG. 1 is a block diagram that shows one example of a time-of-flight light sensing system in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. In addition, common but well-understood elements that are useful or necessary in a commercially feasible embodiment are often not depicted in order to facilitate a less obstructed view of these various embodiments of the present invention.

DETAILED DESCRIPTION

Examples directed to various readout architectures for dark current reduction in indirect time-of-flight sensors are described herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Spatially relative terms, such as "beneath," "below," "over," "under," "above," "upper," "top," "bottom," "left," "right," "center," "middle," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is rotated or turned over, elements described as "below" or "beneath" or "under" other elements or features would then be oriented "above" the other elements or features. Thus, the exemplary terms "below" and "under" can encompass both an orientation of above and below. The device may be otherwise oriented (rotated ninety degrees or at other orientations) and the spatially relative descriptors used herein interpreted accordingly. In addition, it will also be understood that when an element is referred to as being "between" two other elements, it can be the only element between the two other elements, or one or more intervening elements may also be present.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be discussed, various examples of various readout architectures for dark current reduction in indirect time-of-flight sensors are shown. In various examples, decoupling circuits are coupled between respective storage nodes and floating diffusions in a time-of-flight pixel circuit that is used to sense reflected modulated light. As such, a high voltage swing is allowed on the storage nodes for an increased full well capacity (FWC) while limiting the overdrive on the floating diffusions and hence managing dark current. Moreover, using feedback approaches, the potential differences between two floating diffusions included a time-of-flight pixel circuit can be minimized, which reduces the impact of parasitic leakage currents between the nodes in accordance with the teachings of the present invention.

To illustrate, FIG. 1 is a block diagram that shows one example of a time-of-flight light sensing system 100, in accordance with the teachings of the present invention. As shown in the depicted example, time-of-flight light sensing system 100 includes light source 102, a pixel array 110, which includes a plurality of pixel circuits 112, and a control circuit 114 that is coupled to the pixel array 110 and light source 102. As will be discussed in greater detail below, the pixel circuits 112 that are included in the pixel array 110 are time-of-flight pixels circuits that include various examples of decoupling circuits that are coupled between respective storage nodes and floating diffusions, which allow high voltage swings on the memory nodes for an increased full well capacity (FWC) while limiting the overdrive on the floating diffusions and therefore managing or reducing dark current when performing indirect time-of-flight (iTOF) measurements in accordance with the teachings of the present invention.

As shown in the example, light source 102 and pixel array 110 are positioned at a distance L from object 106. Light source 102 is configured to emit modulated light 104 towards object 106. Reflected modulated light 108 is directed back from object 106 to pixel array 110 as shown. It is noted that pixel array 110 and control circuit 114 are represented as separate components in FIG. 1 for explanation purposes. However, in one example, it is appreciated that pixel array 110 and control circuit 114 may be integrated onto a same stacked chip sensor. In other examples, pixel array 110 and control circuit 114 may be integrated onto a non-stacked standard planar sensor.

In the depicted example, time-of-flight light sensing system 100 is a 3D camera that calculates image depth information of a scene (e.g., including object 106) based on indirect time-of-flight (iTOF) measurements with an image sensor that includes pixel array 110. In some examples, it is appreciated that although time-of-flight light sensing system 100 is capable of sensing 3D images, time-of-flight light system 100 may also be utilized to capture 2D images. In various examples, time-of-flight light sensing system 100 may also be utilized to capture high dynamic range (HDR) images.

Continuing with the depicted example, each pixel circuit 112 of pixel array 110 determines depth information for a corresponding portion of object 106 such that a 3D image of object 106 can be generated. In the depicted example, depth information is determined by measuring the delay/phase difference between emitted light 104 and the received reflected light 108 to indirectly determine a round-trip time for light to propagate from light source 102 to object 108 and back to the pixel array 110 of time-of-flight light sensing system 100. The depth information may be based on an electric signal generated by the photodiode included in each pixel circuit 112, which is subsequently transferred to a storage node.

As illustrated, light source 102 (e.g., a light emitting diode, a vertical cavity surface emitting laser, or the like) is configured to emit light 104 (e.g., emitted modulated light waves/pulses) to the object 108 over a distance L. The emitted light 104 is then reflected from the object 108 as reflected light 108 (e.g., reflected modulated light waves/pulses), some of which propagates towards the pixel array 110 of time-of-flight light sensing system 100 over the distance L and is incident upon the pixel circuits 112 of pixel array 110 as image light. Each pixel circuit 112 included in the pixel array 110 includes a photodetector (e.g., one or more photodiodes, avalanche photodiodes, or single-photon avalanche diodes, or the like) to detect the reflected light 108 and convert the reflected light 108 into an electric signal (e.g., electrons, photocurrent, etc.).

As shown in the depicted example, the round-trip time for emitted light 104 to propagate from light source 102 to object 108 and then be reflected back to pixel array 110 can be used to determine the distance L using the following relationships in equations below:

$$T_{TOF} = \frac{2L}{c}$$

$$L = \frac{T_{TOF} \cdot c}{2}$$

where c is the speed of light, which is approximately equal to 3×10⁸ m/s, and $T_{TOF}$ corresponds to the round-trip time, which is the amount of time that it takes for the light to travel to and from the object 106 as shown in FIG. 1. Accordingly, once the round-trip time is known, the distance L may be calculated and subsequently used to determine depth information of object 108.

As shown in the depicted example, control circuit 114 is configured to control and synchronize the operation of pixel array 110 and light source 102, and includes logic and memory that when executed causes time-of-flight light sensing system 100 to perform operations for determining the round-trip time of the light to and from object 106. Determining the round-trip time may be based on, at least in part, timing signals generated by control circuit 114. For indirect time-of-flight (iTOF) measurements, the timing signals are representative of the delay/phase difference 106 between the light waves/pulses of when the light source 102 emits light 104 and when the photodetectors in pixel circuits 112 detect the reflected light 108.

In some examples, time-of-flight light sensing system 100 may be included in a device (e.g., a mobile phone, a tablet, a camera, etc.) that has size and power constraints determined, at least in part, based on the size of the device. Alternatively, or in addition, time-of-flight light sensing system 100 may have specific desired device parameters such as frame rate, depth resolution, lateral resolution, etc.

Figure 2:
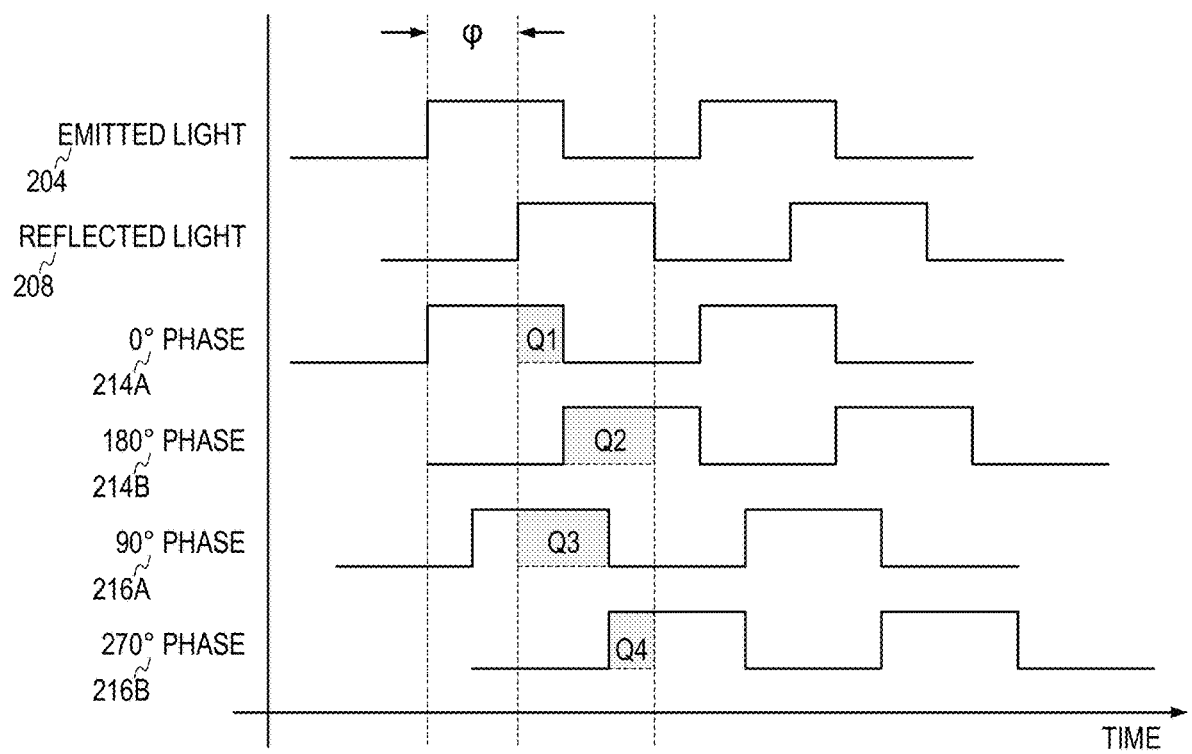
FIG. 2 is a timing diagram that shows an example of modulated light pulses emitted from a light source relative to the receipt of the reflected modulated light pulses and measurements using various phase shifts in an example time-of-flight imaging system accordance with the teachings of the present invention.

FIG. 2 is a timing diagram that illustrates the timing relationship between example light pulses emitted from a light source relative to the receipt of the reflected light pulses and measurements using various phase shifts in an example time-of-flight imaging system accordance with the teachings of the present invention. Specifically, FIG. 2 shows emitted light 204, which represents the modulated light pulses that are emitted from light source 102 to object 106, and corresponding pulses reflected light 208, which represents the reflected light pulses that are back-reflected from object 106 and received by pixel array 110 of FIG. 1.

The example depicted in FIG. 2 also illustrates measurement pulses including a 0° phase signal 214A and a 180° phase signal 214B, as well as measurement pulses including a 90° phase signal 216A and a 270° phase signal 216B, which as shown are all phase-shifted relative to the phase of the pulses of emitted light 204. In addition, FIG. 2 shows that the 0° phase signal 214A and 180° phase signal 214B, as well as the 90° phase signal 216A and 270° phase signal 216B pulses are all modulated at the same frequency as the modulated emitted light 204 and reflected light 208 to realize homodyne detection of the reflected light 208 in accordance with the teachings of the present invention. In various examples, the 0° phase signal 214A and 180° phase signal 214B, as well as the 90° phase signal 216A and 270° phase signal 216B may be utilized to control the switching of transistors in the pixel circuits 112 to measure the reflected light 208. Utilizing the different phases for the measurement pulses as shown allows reconstruction of the encoded distance. In the various examples, at least 3 independent measurements (e.g., sub-frames) are utilized to decode 3 unknowns: distance/phase, reflectivity, and ambient. In examples described herein, 4 phases are utilized (e.g., 0°, 180°, 90°, and 270°).

As will be discussed, the 0° phase signal 214A and 180° phase signal 214B, as well as the 90° phase signal 216A and 270° phase signal 216B pulses may correspond specifically to the switching of transfer transistors that are included in the pixel circuits 112 of pixel array 110. In operation, the switching of the transfer transistors in the pixel circuits 112 of pixel array 110 can be used to transfer respective portions of the charge that is photogenerated in the one or more photodiodes that are included the pixel circuits 112 in response to the reflected light 208 to determine the delay or phase difference φ between the pulses of emitted light 204 and the corresponding pulses of reflected light 208.

For instance, the example illustrated in FIG. 2 shows that a portion of charge Q1 is measured by the pulses of 0° phase signal 214A and that a portion of charge Q2 is measured by the pulses of 180° phase signal 214B in response to reflected light 208. Similarly, a portion of charge Q3 is measured by the pulses of 90° phase 216A and a portion of charge Q4 is measured by the pulses of 270° phase signal 216B in response to reflected light 208. In various examples, the measurements of Q1, Q2, Q3, and Q4 can then be used to determine the delay or phase difference φ between the emitted light 204 and the reflected light 208, and therefore the time of flight $T_{TOF}$ of light from the light source 102 to the object 106 and then back to the pixel array 110 in accordance with the teachings of the present invention.

Figure 3A:
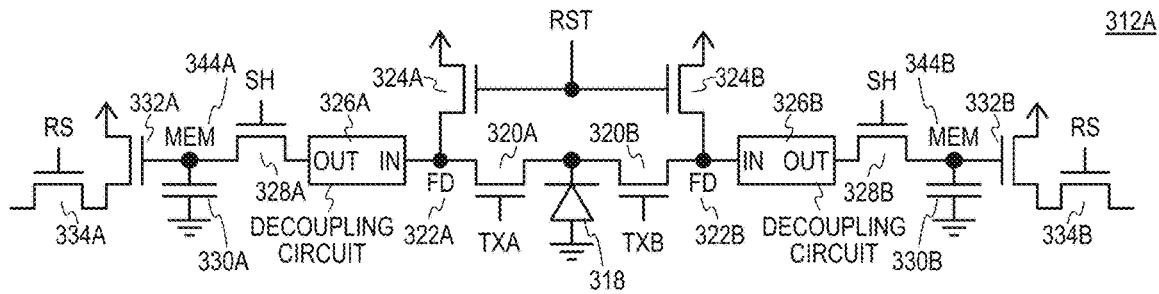
FIG. 3A is a schematic illustrating an example of a time-of-flight pixel in accordance with the teachings of the present invention.

FIG. 3A a schematic illustrating an example of a time-of-flight pixel circuit 312A in accordance with the teachings of the present invention. It is appreciated the pixel circuit 312A of FIG. 3A may be an example of one of the pixel circuits 112 included in pixel array 110 shown in FIG. 1, and that similarly named and numbered elements described above are coupled and function similarly below.

As shown in the example depicted in FIG. 3A, pixel circuit 312A includes a photodiode 318 configured to photogenerate charge or photocurrent in response to incident light. In one example, the light that is incident on photodiodes 318 is the reflected modulated light 108 that is reflected from an object 106 as described in FIG. 1. A first floating diffusion FD 322A is configured to store a first portion of charge photogenerated in the photodiode 318, such as for example charge Q1 or Q3 described in FIG. 2. A second floating diffusion FD 322B is configured to store a second portion of charge photogenerated in the photodiode 318, such as for example charge Q2 or Q4 described in FIG. 2.

A first transfer transistor 320A is configured to transfer the first portion of charge from the photodiode 318 to the first floating diffusion FD 322A in response to a first phase signal TXA. In one example, the first phase signal TXA may be an example of one of the phase signals described in FIG. 2, such as for example 0° phase signal 214A or 90° phase signal 214C. A second transfer transistor 320B is configured to transfer the second portion of charge from the photodiode 318 to the second floating diffusion FD 322B in response to a second phase signal TXB. In one example, the second phase signal TXB may be an example of another one of the phase signals described in FIG. 2, such as for example 180° phase signal 214B or 270° phase signal 214D. In the various examples, the first phase signal TXA and the second phase signal TXB are out of phase with each other, such as for example 180° out of phase with each other. As will be discussed in the various examples, a first storage node MEM 344A is configured to store the first portion of charge from the first floating diffusion FD 322A, and a second storage node MEM 344B is configured to store the second portion of charge from the second floating diffusion FD 322B.

As shown in the depicted example, a first decoupling circuit 326A has an output OUT and an input IN. In the various examples, the output OUT of first decoupling circuit 326A is responsive to the input IN of first decoupling circuit 326A. As shown in the example, the input IN of first decoupling circuit 326A is coupled to the first floating diffusion FD 322A, and the output OUT of first decoupling circuit 326A is coupled to first storage node MEM 344A. In the example depicted in FIG. 3A, the output OUT of first decoupling circuit 326A is coupled to first storage node MEM 344A through a first sample and hold transistor 328A. In the various examples, a voltage swing at the output OUT of first decoupling circuit 326A is greater than a voltage swing at the input IN of first decoupling circuit 326A. As such, it is appreciated that a higher voltage swing is therefore allowed at the first storage node MEM 344A, which therefore allows for an increased full well capacity (FWC) at the first floating diffusion FD 322A while limiting the overdrive on the first floating diffusion FD 322A and hence reducing dark current in accordance with the teachings of the present invention.

Similarly, the example depicted in FIG. 3A also shows a second decoupling circuit 326B that has an output OUT and an input IN. In the various examples, the output OUT of second decoupling circuit 326B is responsive to the input IN of second decoupling circuit 326B. As shown in the example, the input IN of second decoupling circuit 326B is coupled to the second floating diffusion FD 322B, and the output OUT of second decoupling circuit 326B is coupled to second storage node MEM 344B. In the example depicted in FIG. 3A, the output OUT of second decoupling circuit 326B is coupled to second storage node MEM 344B through a second sample and hold transistor 328B. In the various examples, the voltage swing at the output OUT of second decoupling circuit 326B is greater than the voltage swing at the input IN of second decoupling circuit 326B. As such, a higher voltage swing is therefore also allowed at the second storage node MEM 344B, which therefore also allows for an increased full well capacity (FWC) at the second floating diffusion FD 322B while limiting the overdrive on the second floating diffusion FD 322B and hence reducing dark current in accordance with the teachings of the present invention.

In the illustrated example, the first storage node MEM 344A is coupled to a first capacitor 330A and a gate of a first source follower transistor 332A. A first row select transistor 334A is coupled to a source of the first source follower transistor 332A. In the various examples, the first row select transistor 334A is also coupled to a bit line, through which first output signal information may be read out from pixel circuit 312A. Similarly, the second storage node MEM 344B is coupled to a second capacitor 330B and a gate of a second source follower transistor 332B. A second row select transistor 334B is coupled to a source of the second source follower transistor 332B. In the various examples, the second row select transistor 334B is also coupled to a bit line, through which second output signal information may be read out from pixel circuit 312A.

In the various examples, pixel circuit 312A also includes a first reset transistor 324A coupled between a supply rail and the first decoupling circuit 326A. For instance, the example depicted in FIG. 3A shows first reset transistor 324A coupled to the input IN of the first decoupling circuit 326A as well as the first floating diffusion FD 322A. In various examples, first reset transistor 324A is configured to reset the first floating diffusion FD 322A as well the first storage node MEM 344A in response to a reset signal RST. In the example depicted in FIG. 3A, the first reset transistor 324A is configured to reset the first storage node MEM 344A through the first decoupling circuit 326A and the first sample and hold transistor 328A.

Similarly, pixel circuit 312A also includes a second reset transistor 324B coupled between the supply rail and the second decoupling circuit 326B. For instance, the example depicted in FIG. 3A shows second reset transistor 324B coupled to the input IN of the second decoupling circuit 326B as well as the second floating diffusion FD 322B. In various examples, second reset transistor 324B is configured to reset the second floating diffusion FD 322B as well the second storage node MEM 344B in response to the reset signal RST. In the example depicted in FIG. 3A, the second reset transistor 324B is configured to reset the second storage node MEM 344B through the second decoupling circuit 326B and the second sample and hold transistor 328B.

Figure 3B:
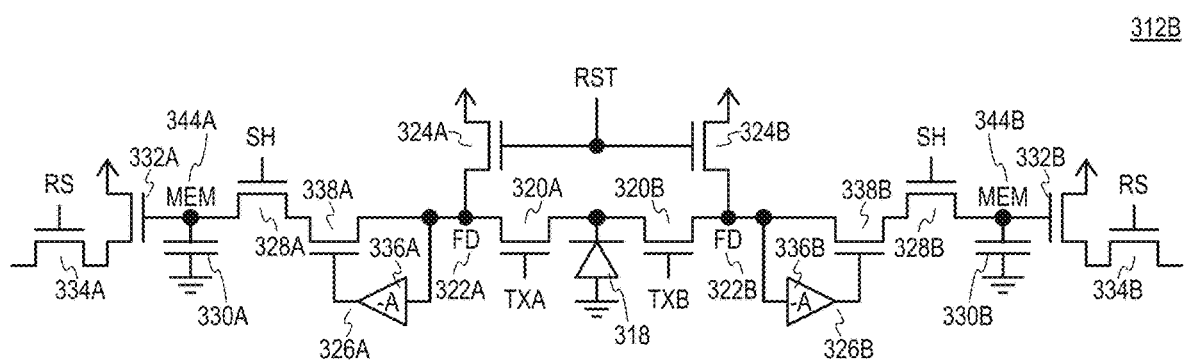
FIG. 3B is a schematic illustrating another example of a time-of-flight pixel in accordance with the teachings of the present invention.

FIG. 3B is a schematic illustrating another example of a time-of-flight pixel circuit 312B in accordance with the teachings of the present invention. It is appreciated the pixel circuit 312B of FIG. 3B may be another example of pixel circuit 312A as shown in FIG. 3A, or another example of one of the pixel circuits 112 included in pixel array 110 shown in FIG. 1, and that similarly named and numbered elements described above are coupled and function similarly below. It is further appreciated that the pixel circuit 312B of FIG. 3B shares many similarities with the example pixel circuit 312A described in detail in FIG. 3A.

For instance, as shown in the example depicted in FIG. 3B, pixel circuit 312B includes a photodiode 318 configured to photogenerate charge or photocurrent in response to incident light, which may for example be the reflected modulated light 108 that is reflected from an object 106 as described in FIG. 1. A first floating diffusion FD 322A is configured to store a first portion of charge photogenerated in the photodiode 318, such as for example charge Q1 or Q3, and a second floating diffusion FD 322B is configured to store a second portion of charge photogenerated in the photodiode 318, such as for example charge Q2 or Q4.

A first transfer transistor 320A is configured to transfer the first portion of charge from the photodiode 318 to the first floating diffusion FD 322A in response to a first phase signal TXA, and a second transfer transistor 320B is configured to transfer the second portion of charge from the photodiode 318 to the second floating diffusion FD 322B in response to a second phase signal TXB. A first storage node MEM 344A is configured to store the first portion of charge from the first floating diffusion FD 322A, and a second storage node MEM 344B is configured to store the second portion of charge from the second floating diffusion FD 322B.

One of the differences between the example pixel circuit 312B shown FIG. 3B and the example pixel circuit 312A shown in FIG. 3A is that in the example pixel circuit 312B shown FIG. 3B, the first decoupling circuit 326A is illustrated as including a first transistor 338A having a drain (e.g., output OUT of first decoupling circuit 326A) coupled to the first storage node MEM 344A and a source (e.g., input IN of first decoupling circuit 326A) coupled to the first floating diffusion FD 322A. In the depicted example, the first transistor 338A is coupled to the first storage node MEM 344A through the first sample and hold transistor 328A. Similarly, the second decoupling circuit 326B is illustrated as including a second transistor 338B having a drain (e.g., output OUT of second decoupling circuit 326B) coupled to the second storage node MEM 344B and a source (e.g., input IN of second decoupling circuit 326B) coupled to the second floating diffusion FD 322B. In the depicted example, the second transistor 338B is coupled to the second storage node MEM 344B through the second sample and hold transistor 328B.

The example depicted in FIG. 3B also illustrates that the first decoupling circuit 326A further includes a first amplifier 336A having an input coupled to the first floating diffusion FD 322A and an output coupled to a gate of the first transistor 338A. Similarly, the second decoupling circuit 326B further includes a second amplifier 336B having an input coupled to the second floating diffusion FD 322B and an output coupled to a gate of the second transistor 338B. In the example, the first amplifier 336A and the second amplifier 336B are inverting amplifiers having a negative gain of −A.

As shown in the depicted example, the input of the first amplifier 336A is also coupled to the source of first transistor 338A, and the input of the second amplifier 336B is also coupled to the source of second transistor 338B. As such, a first feedback is provided to the first amplifier 336A through the source of first transistor 338A, and a second feedback is provided to the second amplifier 336A through the source of second transistor 338B. With the first feedback coupled to the input of the first amplifier 336A and the second feedback coupled to the input of the second amplifier 336B, it is appreciated that the potential differences between the first floating diffusion FD 322A and the second floating diffusion FD 322B are reduced, which reduces the impact of parasitic leakage currents between the nodes.

For instance, the feeding back of the source potential of the first and second transistors 338A and 338B to the inputs of the first and second amplifiers 336A and 336B, respectively, with the negative amplification −A to the gates of first and second transistors 338A and 338B, results in a dramatic reduction of the source potential sensitivity to the photocurrent generated by the photodiode 318, which is coupled to the first and second floating diffusions FD 322A and 322B through the respective transfer transistors 320A and 320B. The photocurrent generated by the photodiode 318 can still be measured at the output drain terminals of first and second transistors 338A and 338B, but now the source potentials of the first and second transistors 338A and 338B are decoupled from the drain terminals so that a larger voltage swing can be utilized on drain terminals of the first and second transistors 338A and 338B (e.g., the outputs OUT of the decoupling circuits 326A and 326B) while maintaining a minimal voltage swings at the source terminals of the first and second transistors 338A and 338B (e.g., the inputs IN of the decoupling circuits 326A and 326B).

It is appreciated that for a high gain −A for the first and second amplifiers 336A and 336B, the potentials at the first and second floating diffusions FD 322A and 332B converge the potentials at the source terminals of first and second transistors 338A and 338B. The photocurrent from photodiode 318 is passed through the first and second transistors 338A and 338B, and either drained to the supply rail through the first and second reset transistors 324A and 324B, acting as overflow gates, or are integrated through first and second sample and hold transistors 328A and 328B to the first and second memory nodes MEM 344A and 344B. Therefore, the voltages at the first and second memory nodes MEM 344A and 344B can now have a large voltage swing and hence, full well capacity (FWC) without compromising dark current related to the first and transfer transistors 320A and 320B.

Moreover, due to the stable first and second floating diffusions FD 322A and 322B, potential leakage through a parasitic resistance between the first and second floating diffusions FD 322A and 322B is reduced, which increases modulation contrast in accordance with the teachings of the present invention.

In one example, it is noted that both power supply rails of the inverting first and second amplifiers 336A and 336B may be switched to $V_{DD}$ to initiate a reset operation of the first and second storage nodes MEM 344A and 344B, followed by an activation of the first and second reset transistors 324A and 324B, hence, resetting the first and second floating diffusions FD 322A and 322B and the first and second storage nodes MEM 344A and 344B.

Similar to the example pixel circuit 312A of FIG. 3A, the first storage node MEM 344A in the example pixel circuit 312B of FIG. 3B is coupled to a first capacitor 330A and a gate of a first source follower transistor 332A. A first row select transistor 334A is coupled to a source of the first source follower transistor 332A. In the various examples, the first row select transistor 334A is also coupled to a bit line, through which first output signal information may be read out from pixel circuit 312B. Similarly, the second storage node MEM 344B is coupled to a second capacitor 330B and a gate of a second source follower transistor 332B. A second row select transistor 334B is coupled to a source of the second source follower transistor 332B. In the various examples, the second row select transistor 334B is also coupled to a bit line, through which second output signal information may be read out from pixel circuit 312B.

As shown in the depicted example, pixel circuit 312B also includes a first reset transistor 324A coupled between a supply rail and the first decoupling circuit 326A. In particular, the example depicted in FIG. 3B shows first reset transistor 324A coupled to the source of first transistor 338A as well as the first floating diffusion FD 322A. In various examples, first reset transistor 324A is configured to reset the first floating diffusion FD 322A as well the first storage node MEM 344A in response to a reset signal RST. In the example depicted in FIG. 3B, the first reset transistor 324A may be configured to reset the first storage node MEM 344A through the first transistor 338A and the first sample and hold transistor 328A.

Similarly, pixel circuit 312B also includes a second reset transistor 324B coupled between the supply rail and the second decoupling circuit 326B. In particular, the example depicted in FIG. 3B shows second reset transistor 324B coupled to the source of second transistor 338B as well as the second floating diffusion FD 322B. In various examples, second reset transistor 324B is configured to reset the second floating diffusion FD 322B as well the second storage node MEM 344B in response to the reset signal RST. In the example depicted in FIG. 3B, the second reset transistor 324B is configured to reset the second storage node MEM 344B through the second transistor 338B and the second sample and hold transistor 328B.

Figure 3C:
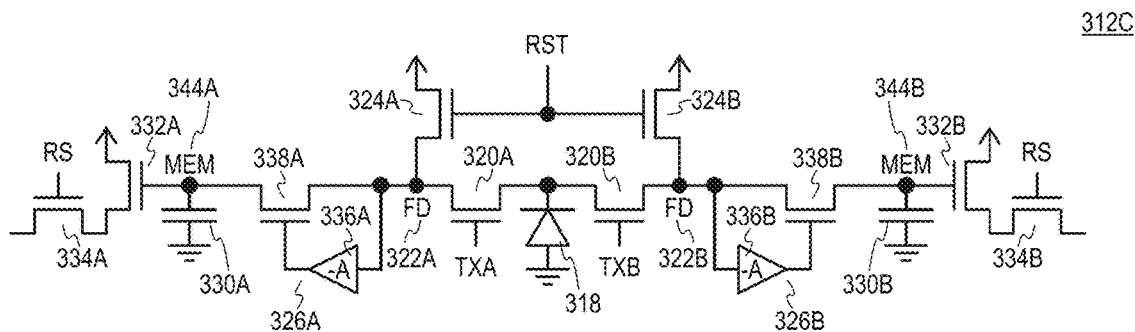
FIG. 3C is a schematic illustrating yet another example of a time-of-flight pixel in accordance with the teachings of the present invention.

FIG. 3C is a schematic illustrating yet another example of a time-of-flight pixel circuit 312C in accordance with the teachings of the present invention. It is appreciated the pixel circuit 312C of FIG. 3C may be another example of pixel circuit 312B as shown in FIG. 3B, or another example of pixel circuit 312A as shown in FIG. 3A, or another example of one of the pixel circuits 112 included in pixel array 110 shown in FIG. 1, and that similarly named and numbered elements described above are coupled and function similarly below. It is further appreciated that the pixel circuit 312C of FIG. 3C shares many similarities with the example pixel circuit 312B described in detail in FIG. 3B.

For instance, as shown in the example depicted in FIG. 3C, pixel circuit 312C includes a photodiode 318 configured to photogenerate charge or photocurrent in response to incident light, which may for example be the reflected modulated light 108 that is reflected from an object 106 as described in FIG. 1. A first floating diffusion FD 322A is configured to store a first portion of charge photogenerated in the photodiode 318, such as for example charge Q1 or Q3, and a second floating diffusion FD 322B is configured to store a second portion of charge photogenerated in the photodiode 318, such as for example charge Q2 or Q4.

A first transfer transistor 320A is configured to transfer the first portion of charge from the photodiode 318 to the first floating diffusion FD 322A in response to a first phase signal TXA, and a second transfer transistor 320B is configured to transfer the second portion of charge from the photodiode 318 to the second floating diffusion FD 322B in response to a second phase signal TXB. A first storage node MEM 344A is configured to store the first portion of charge from the first floating diffusion FD 322A, and a second storage node MEM 344B is configured to store the second portion of charge from the second floating diffusion FD 322B.

Similar to the example pixel circuit 312B shown FIG. 3B, the first decoupling circuit 326A in example pixel circuit 312C of FIG. 3C is illustrated as including a first transistor 338A having a drain (e.g., output OUT of first decoupling circuit 326A) coupled to the first storage node MEM 344A and a source (e.g., input IN of first decoupling circuit 326A) coupled to the first floating diffusion FD 322A. Similarly, the second decoupling circuit 326B is illustrated as including a second transistor 338B having a drain (e.g., output OUT of second decoupling circuit 326B) coupled to the second storage node MEM 344B and a source (e.g., input IN of second decoupling circuit 326B) coupled to the second floating diffusion FD 322B.

The example pixel circuit 312C depicted in FIG. 3C also shows that the first decoupling circuit 326A further includes a first amplifier 336A having an input coupled to the first floating diffusion FD 322A and an output coupled to a gate of the first transistor 338A. Similarly, the second decoupling circuit 326B further includes a second amplifier 336B having an input coupled to the second floating diffusion FD 322B and an output coupled to a gate of the second transistor 338B. In the example, the first amplifier 336A and the second amplifier 336B are inverting amplifiers having a negative gain of −A. As shown in the depicted example, the input of the first amplifier 336A is also coupled to the source of first transistor 338A, and the input of the second amplifier 336B is also coupled to the source of second transistor 338B. As such, a first feedback is provided to the first amplifier 336A through the source of first transistor 338A, and a second feedback is provided to the second amplifier 336A through the source of second transistor 338B.

Similar to the example pixel circuit 312B of FIG. 3B, the first storage node MEM 344A in the example pixel circuit 312C of FIG. 3C is coupled to a first capacitor 330A and a gate of a first source follower transistor 332A. A first row select transistor 334A is coupled to a source of the first source follower transistor 332A. In the various examples, the first row select transistor 334A is also coupled to a bit line, through which first output signal information may be read out from pixel circuit 312C. Similarly, the second storage node MEM 344B is coupled to a second capacitor 330B and a gate of a second source follower transistor 332B. A second row select transistor 334B is coupled to a source of the second source follower transistor 332B. In the various examples, the second row select transistor 334B is also coupled to a bit line, through which second output signal information may be read out from pixel circuit 312C.

As shown in the depicted example, pixel circuit 312C also includes a first reset transistor 324A coupled between a supply rail and the first decoupling circuit 326A. In particular, the example depicted in FIG. 3C shows first reset transistor 324A coupled to the source of first transistor 338A as well as the first floating diffusion FD 322A. Similarly, pixel circuit 312C also includes a second reset transistor 324B coupled between the supply rail and the second decoupling circuit 326B. In particular, the example depicted in FIG. 3C shows second reset transistor 324B coupled to the source of second transistor 338B as well as the second floating diffusion FD 322B.

One of the differences between the example pixel circuit 312C of FIG. 3C and the example pixel circuit 312B of FIG. 3B is that the example pixel circuit 312C of FIG. 3C does not include first and second sample and hold circuits 328A and 328B coupled between the outputs of the first and second decoupling circuits 326A and 326B and the first and second storage nodes MEM 344A and 344B. However, it is appreciated that the first and second transistors 338A and 338B may also fulfill the purpose of sampling the signal level in the first and second storage nodes MEM 344A and 344B by activation of the reset signal RST coupled to the gates of the first and second reset transistors 324A and 324B, which will result in a low signal at the output of the inverting amplifiers 336A and 336B and hence, switch OFF the decoupling first and second transistors 338A and 338B, and therefore sampling the signal level in the first and second storage nodes MEM 344A and 344B until the reset period is initiated.

In various examples, the first reset transistor 324A is configured to reset the first floating diffusion FD 322A as well the first storage node MEM 344A in response to a reset signal RST, and the second reset transistor 324B is configured to reset the second floating diffusion FD 322B as well the second storage node MEM 344B in response to the reset signal RST. In the example depicted in FIG. 3C, the first reset transistor 324A may be configured to reset the first storage node MEM 344A through the first transistor 338A, and the second reset transistor 324B is configured to reset the second storage node MEM 344B through the second transistor 338B.

Figure 3D:
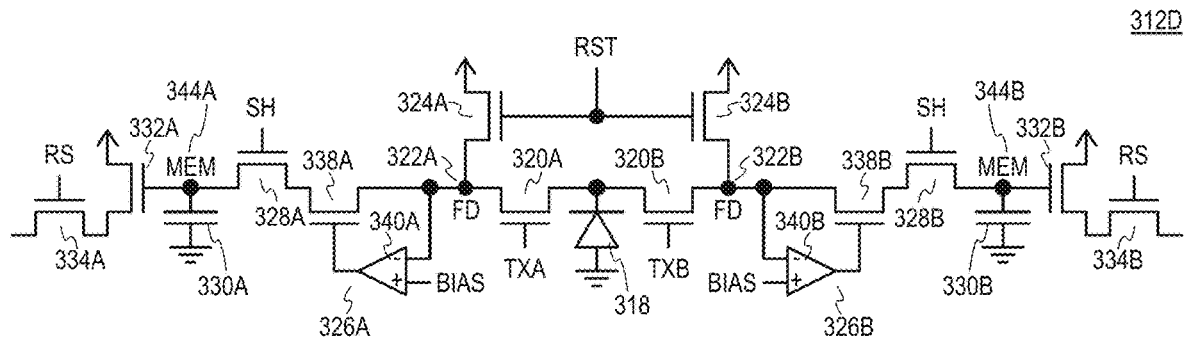
FIG. 3D is a schematic illustrating still another example of a time-of-flight pixel in accordance with the teachings of the present invention.

FIG. 3D is a schematic illustrating still another example of a time-of-flight pixel circuit 312D in accordance with the teachings of the present invention. It is appreciated the pixel circuit 312D of FIG. 3D may be another example of pixel circuit 312C as shown in FIG. 3C, or another example of pixel circuit 312B as shown in FIG. 3B, or another example of pixel circuit 312A as shown in FIG. 3A, or another example of one of the pixel circuits 112 included in pixel array 110 shown in FIG. 1, and that similarly named and numbered elements described above are coupled and function similarly below. It is further appreciated that the pixel circuit 312D of FIG. 3D shares many similarities with the example pixel circuit 312B described in detail in FIG. 3B.

For instance, as shown in the example depicted in FIG. 3D, pixel circuit 312D includes a photodiode 318 configured to photogenerate charge or photocurrent in response to incident light, which may for example be the reflected modulated light 108 that is reflected from an object 106 as described in FIG. 1. A first floating diffusion FD 322A is configured to store a first portion of charge photogenerated in the photodiode 318, such as for example charge Q1 or Q3, and a second floating diffusion FD 322B is configured to store a second portion of charge photogenerated in the photodiode 318, such as for example charge Q2 or Q4.

A first transfer transistor 320A is configured to transfer the first portion of charge from the photodiode 318 to the first floating diffusion FD 322A in response to a first phase signal TXA, and a second transfer transistor 320B is configured to transfer the second portion of charge from the photodiode 318 to the second floating diffusion FD 322B in response to a second phase signal TXB. A first storage node MEM 344A is configured to store the first portion of charge from the first floating diffusion FD 322A, and a second storage node MEM 344B is configured to store the second portion of charge from the second floating diffusion FD 322B.

Similar to the example pixel circuit 312B shown FIG. 3B, the first decoupling circuit 326A in example pixel circuit 312D of FIG. 3D is illustrated as including a first transistor 338A having a drain (e.g., output OUT of first decoupling circuit 326A) coupled to the first storage node MEM 344A and a source (e.g., input IN of first decoupling circuit 326A) coupled to the first floating diffusion FD 322A. In the depicted example, the first transistor 338A is coupled to the first storage node MEM 344A through the first sample and hold transistor 328A. Similarly, the second decoupling circuit 326B is illustrated as including a second transistor 338B having a drain (e.g., output OUT of second decoupling circuit 326B) coupled to the second storage node MEM 344B and a source (e.g., input IN of second decoupling circuit 326B) coupled to the second floating diffusion FD 322B. In the depicted example, the second transistor 338B is coupled to the second storage node MEM 344B through the second sample and hold transistor 328B.

One of the differences between the example pixel circuit 312D shown FIG. 3D and the example pixel circuit 312B shown in FIG. 3B is that in the example pixel circuit 312D shown FIG. 3D, the first decoupling circuit 326A further includes a first amplifier 340A, which is a differential amplifier or an operational amplifier having an inverting input coupled to the first floating diffusion FD 322A, a non-inverting input coupled to receive a bias voltage BIAS, and an output coupled to a gate of the first transistor 338A. Similarly, the second decoupling circuit 326B further includes a second amplifier 340B, which is a differential amplifier or an operational amplifier having an inverting input coupled to the second floating diffusion FD 322B, a non-inverting input coupled to receive the bias voltage BIAS, and an output coupled to a gate of the second transistor 338B.

As shown in the depicted example, the inverting input of the first amplifier 340A is also coupled to the source of first transistor 338A, and the inverting input of the second amplifier 340B is also coupled to the source of second transistor 338B. As such, a first feedback is provided to the first amplifier 340A through the source of first transistor 338A, and a second feedback is provided to the second amplifier 340A through the source of second transistor 338B. With the first feedback coupled to the inverting input of the first amplifier 340A and the second feedback coupled to inverting input of the second amplifier 340B, it is appreciated that the potential differences between the first floating diffusion FD 322A and the second floating diffusion FD 322B are reduced, which reduces the impact of parasitic leakage currents between the nodes.

It is further appreciated that with the first and second amplifiers 340A and 340B implemented with differential or operational amplifiers as shown in FIG. 3D, more robust control of the floating diffusion FD 322A and 322B potentials is enabled, but with the tradeoff of a larger footprint. As shown, the gates of the first and second transistors 338A and 338B are driven by the outputs of the first and second amplifiers 340A and 340B. With the inverting inputs of the first and second amplifiers 340A and 340B coupled to the corresponding first and second floating diffusions FD 322A and 322B and the sources of the first and second transistors 338A and 338B, negative feedback is established, while the non-inverting inputs of the first and second amplifiers 340A and 340B are coupled to the bias voltage BIAS.

Similar to the example pixel circuit 312B of FIG. 3B, the first storage node MEM 344A in the example pixel circuit 312D of FIG. 3D is coupled to a first capacitor 330A and a gate of a first source follower transistor 332A. A first row select transistor 334A is coupled to a source of the first source follower transistor 332A. In the various examples, the first row select transistor 334A is also coupled to a bit line, through which first output signal information may be read out from pixel circuit 312D. Similarly, the second storage node MEM 344B is coupled to a second capacitor 330B and a gate of a second source follower transistor 332B. A second row select transistor 334B is coupled to a source of the second source follower transistor 332B. In the various examples, the second row select transistor 334B is also coupled to a bit line, through which second output signal information may be read out from pixel circuit 312D.

As shown in the depicted example, pixel circuit 312D also includes a first reset transistor 324A coupled between a supply rail and the first decoupling circuit 326A. In particular, the example depicted in FIG. 3D shows first reset transistor 324A coupled to the source of first transistor 338A as well as the first floating diffusion FD 322A. In various examples, first reset transistor 324A is configured to reset the first floating diffusion FD 322A as well the first storage node MEM 344A in response to a reset signal RST. In the example depicted in FIG. 3D, the first reset transistor 324A may be configured to reset the first storage node MEM 344A through the first transistor 338A and the first sample and hold transistor 328A.

Similarly, pixel circuit 312D also includes a second reset transistor 324B coupled between the supply rail and the second decoupling circuit 326B. In particular, the example depicted in FIG. 3D shows second reset transistor 324B coupled to the source of second transistor 338B as well as the second floating diffusion FD 322B. In various examples, second reset transistor 324B is configured to reset the second floating diffusion FD 322B as well the second storage node MEM 344B in response to the reset signal RST. In the example depicted in FIG. 3D, the second reset transistor 324B is configured to reset the second storage node MEM 344B through the second transistor 338B and the second sample and hold transistor 328B.

In one example, during a reset mode a high potential bias voltage may be applied to the non-inverting inputs of the first and second amplifiers 340A and 340B to create a high output at the gates of the decoupling first and second transistors 338A and 338B resulting in operation in a triode mode to enable the reset of the first and second storage nodes MEM 344A and 344B through the first and second reset transistors 324A and 324B. During a decoupling period, the potential at the non-inverting inputs of the first and second amplifiers 340A and 340B may then be lowered to achieve saturation of the decoupling first and second transistors 338A and 338B.

Figure 3E:
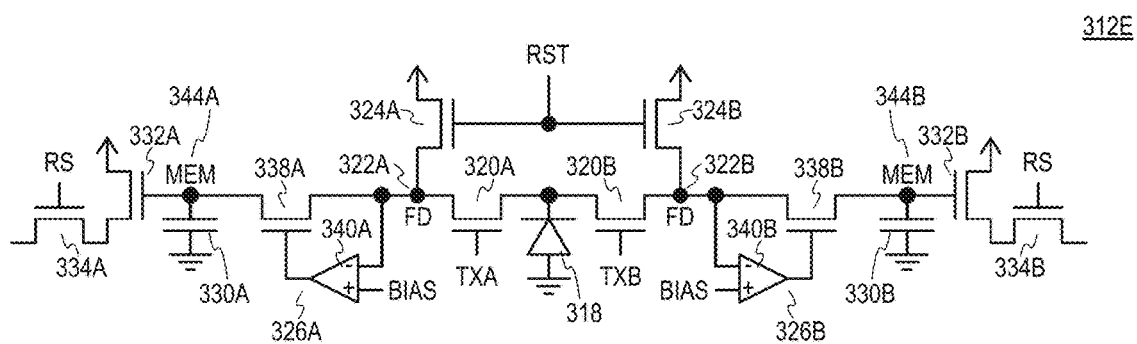
FIG. 3E is a schematic illustrating yet another example of a time-of-flight pixel in accordance with the teachings of the present invention.

FIG. 3E is a schematic illustrating yet another example of a time-of-flight pixel circuit 312E in accordance with the teachings of the present invention. It is appreciated the pixel circuit 312E of FIG. 3E may be another example of pixel circuit 312D as shown in FIG. 3D, or another example of 312C as shown in FIG. 3C, or another example of pixel circuit 312B as shown in FIG. 3B, or another example of 312A as shown in FIG. 3A, or another example of one of the pixel circuits 112 included in pixel array 110 shown in FIG. 1, and that similarly named and numbered elements described above are coupled and function similarly below. It is further appreciated that the pixel circuit 312E of FIG. 3E shares many similarities with the example pixel circuit 312C described in detail in FIG. 3C.

For instance, as shown in the example depicted in FIG. 3E, pixel circuit 312E includes a photodiode 318 configured to photogenerate charge or photocurrent in response to incident light, which may for example be the reflected modulated light 108 that is reflected from an object 106 as described in FIG. 1. A first floating diffusion FD 322A is configured to store a first portion of charge photogenerated in the photodiode 318, such as for example charge Q1 or Q3, and a second floating diffusion FD 322B is configured to store a second portion of charge photogenerated in the photodiode 318, such as for example charge Q2 or Q4.

A first transfer transistor 320A is configured to transfer the first portion of charge from the photodiode 318 to the first floating diffusion FD 322A in response to a first phase signal TXA, and a second transfer transistor 320B is configured to transfer the second portion of charge from the photodiode 318 to the second floating diffusion FD 322B in response to a second phase signal TXB. A first storage node MEM 344A is configured to store the first portion of charge from the first floating diffusion FD 322A, and a second storage node MEM 344B is configured to store the second portion of charge from the second floating diffusion FD 322B.

Similar to the example pixel circuit 312C shown FIG. 3C, the first decoupling circuit 326A in example pixel circuit 312E of FIG. 3E is illustrated as including a first transistor 338A having a drain (e.g., output OUT of first decoupling circuit 326A) coupled to the first storage node MEM 344A and a source (e.g., input IN of first decoupling circuit 326A) coupled to the first floating diffusion FD 322A. Similarly, the second decoupling circuit 326B is illustrated as including a second transistor 338B having a drain (e.g., output OUT of second decoupling circuit 326B) coupled to the second storage node MEM 344B and a source (e.g., input IN of second decoupling circuit 326B) coupled to the second floating diffusion FD 322B.

One of the differences between the example pixel circuit 312E shown FIG. 3E and the example pixel circuit 312C shown in FIG. 3C is that in the example pixel circuit 312E shown FIG. 3E, the first decoupling circuit 326A further includes a first amplifier 340A, which is a differential amplifier or an operational amplifier having an inverting input coupled to the first floating diffusion FD 322A, a non-inverting input coupled to receive a bias voltage BIAS, and an output coupled to a gate of the first transistor 338A. Similarly, the second decoupling circuit 326B further includes a second amplifier 340B, which is a differential amplifier or an operational amplifier having an inverting input coupled to the second floating diffusion FD 322B, a non-inverting input coupled to receive the bias voltage BIAS, and an output coupled to a gate of the second transistor 338B.

As shown in the depicted example, the inverting input of the first amplifier 340A is also coupled to the source of first transistor 338A, and the inverting input of the second amplifier 340B is also coupled to the source of second transistor 338B. As such, a first feedback is provided to the first amplifier 340A through the source of first transistor 338A, and a second feedback is provided to the second amplifier 340A through the source of second transistor 338B. With the first feedback coupled to the inverting input of the first amplifier 340A and the second feedback coupled to inverting input of the second amplifier 340B, it is appreciated that the potential differences between the first floating diffusion FD 322A and the second floating diffusion FD 322B are reduced, which reduces the impact of parasitic leakage currents between the nodes.

It is further appreciated that with the first and second amplifiers 340A and 340B implemented with differential or operational amplifiers as shown in FIG. 3E, more robust control of the floating diffusion FD 322A and 322B potentials is enabled, but with the tradeoff of a larger footprint. As shown, the gates of the first and second transistors 338A and 338B are driven by the outputs of the first and second amplifiers 340A and 340B. With the inverting inputs of the first and second amplifiers 340A and 340B coupled to the corresponding first and second floating diffusions FD 322A and 322B and the sources of the first and second transistors 338A and 338B, negative feedback is established, while the non-inverting inputs of the first and second amplifiers 340A and 340B are coupled to the bias voltage BIAS.

Similar to the example pixel circuit 312C of FIG. 3C, the first storage node MEM 344A in the example pixel circuit 312E of FIG. 3E is coupled to a first capacitor 330A and a gate of a first source follower transistor 332A. A first row select transistor 334A is coupled to a source of the first source follower transistor 332A. In the various examples, the first row select transistor 334A is also coupled to a bit line, through which first output signal information may be read out from pixel circuit 312E. Similarly, the second storage node MEM 344B is coupled to a second capacitor 330B and a gate of a second source follower transistor 332B. A second row select transistor 334B is coupled to a source of the second source follower transistor 332B. In the various examples, the second row select transistor 334B is also coupled to a bit line, through which second output signal information may be read out from pixel circuit 312E.

As shown in the depicted example, pixel circuit 312E also includes a first reset transistor 324A coupled between a supply rail and the first decoupling circuit 326A. In particular, the example depicted in FIG. 3E shows first reset transistor 324A coupled to the source of first transistor 338A as well as the first floating diffusion FD 322A. Similarly, pixel circuit 312E also includes a second reset transistor 324B coupled between the supply rail and the second decoupling circuit 326B. In particular, the example depicted in FIG. 3E shows second reset transistor 324B coupled to the source of second transistor 338B as well as the second floating diffusion FD 322B.

Similar to the example pixel circuit 312C of FIG. 3C, the example pixel circuit 312E of FIG. 3E also does not include first and second sample and hold circuits 328A and 328B coupled between the outputs of the first and second decoupling circuits 326A and 326B and the first and second storage nodes MEM 344A and 344B. Thus, it is appreciated that the first and second transistors 338A and 338B may also fulfill the purpose of sampling the signal level in the first and second storage nodes MEM 344A and 344B by activation of the reset signal RST coupled to the gates of the first and second reset transistors 324A and 324B, which will result in a low signal at the output of the operational amplifiers 340A and 340B and hence, switch OFF the decoupling first and second transistors 338A and 338B, and therefore sampling the signal level in the first and second storage nodes MEM 344A and 344B until the reset period is initiated.

In various examples, the first reset transistor 324A is configured to reset the first floating diffusion FD 322A as well the first storage node MEM 344A in response to a reset signal RST, and the second reset transistor 324B is configured to reset the second floating diffusion FD 322B as well the second storage node MEM 344B in response to the reset signal RST. In the example depicted in FIG. 3E, the first reset transistor 324A may be configured to reset the first storage node MEM 344A through the first transistor 338A, and the second reset transistor 324B is configured to reset the second storage node MEM 344B through the second transistor 338B.

Figure 4A:
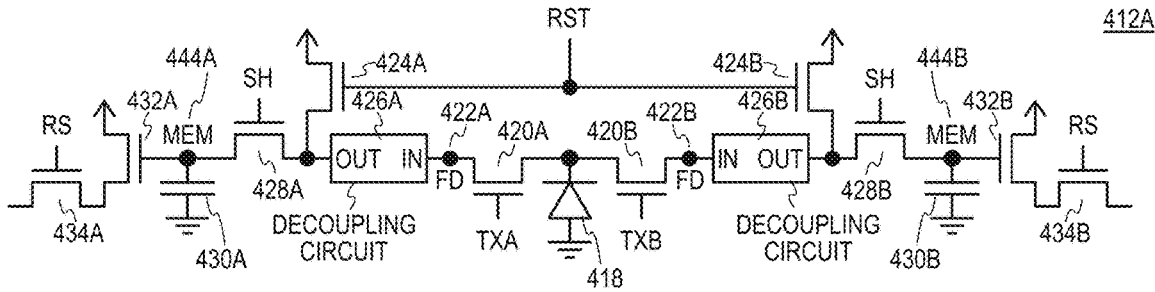
FIG. 4A is a schematic illustrating an example of a time-of-flight pixel in accordance with the teachings of the present invention.

FIG. 4A is a schematic illustrating another example of a time-of-flight pixel circuit 412A in accordance with the teachings of the present invention. It is appreciated the pixel circuit 412A of FIG. 4A may be another example of pixel circuit 312A as shown in FIG. 3A, or another example of one of the pixel circuits 112 included in pixel array 110 shown in FIG. 1, and that similarly named and numbered elements described above are coupled and function similarly below. It is further appreciated that the pixel circuit 412A of FIG. 4A shares many similarities with the example pixel circuit 312A described in detail in FIG. 3A.

For instance, as shown in the example depicted in FIG. 4A, pixel circuit 412A includes a photodiode 418 configured to photogenerate charge or photocurrent in response to incident light, which may for example be the reflected modulated light 108 that is reflected from an object 106 as described in FIG. 1. A first floating diffusion FD 422A is configured to store a first portion of charge photogenerated in the photodiode 418, such as for example charge Q1 or Q3, and a second floating diffusion FD 422B is configured to store a second portion of charge photogenerated in the photodiode 418, such as for example charge Q2 or Q4.

A first transfer transistor 420A is configured to transfer the first portion of charge from the photodiode 418 to the first floating diffusion FD 422A in response to a first phase signal TXA, and a second transfer transistor 420B is configured to transfer the second portion of charge from the photodiode 418 to the second floating diffusion FD 422B in response to a second phase signal TXB. A first storage node MEM 444A is configured to store the first portion of charge from the first floating diffusion FD 422A, and a second storage node MEM 444B is configured to store the second portion of charge from the second floating diffusion FD 422B.

As shown in the depicted example, a first decoupling circuit 426A has an output OUT and an input IN. In the various examples, the output OUT of first decoupling circuit 426A is responsive to the input IN of first decoupling circuit 426A. As shown in the example, the input IN of first decoupling circuit 426A is coupled to the first floating diffusion FD 422A, and the output OUT of first decoupling circuit 426A is coupled to first storage node MEM 444A. In the example depicted in FIG. 4A, the output OUT of first decoupling circuit 426A is coupled to first storage node MEM 444A through a first sample and hold transistor 428A. In the various examples, a voltage swing at the output OUT of first decoupling circuit 426A is greater than a voltage swing at the input IN of first decoupling circuit 426A. As such, it is appreciated that a higher voltage swing is therefore allowed at the first storage node MEM 444A, which therefore allows for an increased full well capacity (FWC) at the first floating diffusion FD 422A while limiting the overdrive on the first floating diffusion FD 422A and hence managing dark current in accordance with the teachings of the present invention.

Similarly, the example depicted in FIG. 4A also shows a second decoupling circuit 426B that has an output OUT and an input IN. In the various examples, the output OUT of second decoupling circuit 426B is responsive to the input IN of second decoupling circuit 426B. As shown in the example, the input IN of second decoupling circuit 426B is coupled to the second floating diffusion FD 422B, and the output OUT of second decoupling circuit 426B is coupled to second storage node MEM 444B. In the example depicted in FIG. 4A, the output OUT of second decoupling circuit 426B is coupled to second storage node MEM 444B through a second sample and hold transistor 428B. In the various examples, the voltage swing at the output OUT of second decoupling circuit 426B is greater than the voltage swing at the input IN of second decoupling circuit 426B. As such, a higher voltage swing is therefore also allowed at the second storage node MEM 444B, which therefore also allows for an increased full well capacity (FWC) at the second floating diffusion FD 422B while limiting the overdrive on the second floating diffusion FD 422B and hence reducing dark current in accordance with the teachings of the present invention.

In the illustrated example, the first storage node MEM 444A is coupled to a first capacitor 430A and a gate of a first source follower transistor 432A. A first row select transistor 434A is coupled to a source of the first source follower transistor 432A. In the various examples, the first row select transistor 434A is also coupled to a bit line, through which first output signal information may be read out from pixel circuit 412A. Similarly, the second storage node MEM 444B is coupled to a second capacitor 430B and a gate of a second source follower transistor 432B. A second row select transistor 434B is coupled to a source of the second source follower transistor 432B. In the various examples, the second row select transistor 434B is also coupled to a bit line, through which second output signal information may be read out from pixel circuit 412A.

In the various examples, pixel circuit 412A also includes a first reset transistor 424A coupled between a supply rail and the first decoupling circuit 426A. In addition, pixel circuit 412A also includes a second reset transistor 424B coupled between the supply rail and the second decoupling circuit 426B.

One of the differences between pixel circuit 412A of FIG. 4A and pixel circuit 312A of FIG. 3A is that in example pixel circuit 412A of of FIG. 4A, the first reset transistor 424A coupled to the output OUT of first decoupling circuit 426A. In various examples, first reset transistor 424A is configured to reset the first floating diffusion FD 422A as well the first storage node MEM 444A in response to a reset signal RST. In the example depicted in FIG. 4A, the first reset transistor 424A is configured to reset the first storage node MEM 444A through first sample and hold transistor 428A, and the first floating diffusion 422A through the first decoupling circuit 426A.

Similarly, the second reset transistor 424B of example pixel circuit 412A of FIG. 4A is coupled to the output OUT of second decoupling circuit 426B. In various examples, second reset transistor 424B is configured to reset the first floating diffusion FD 422A as well the first storage node MEM 444A in response to the reset signal RST. In the example depicted in FIG. 4A, the second reset transistor 424B is configured to reset the second storage node MEM 444B through second sample and hold transistor 428B, and the second floating diffusion 422B through the second decoupling circuit 426B.

Figure 4B:
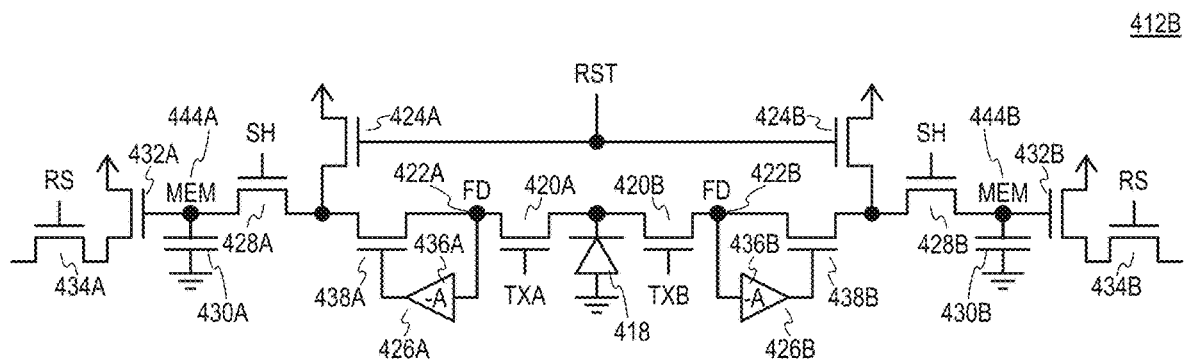
FIG. 4B is a schematic illustrating another example of a time-of-flight pixel in accordance with the teachings of the present invention.

FIG. 4B is a schematic illustrating another example of a time-of-flight pixel circuit 412B in accordance with the teachings of the present invention. It is appreciated the pixel circuit 412B of FIG. 4B may be another example of pixel circuit 412A as shown in FIG. 4A, or another example of one of the pixel circuits 112 included in pixel array 110 shown in FIG. 1, and that similarly named and numbered elements described above are coupled and function similarly below. It is further appreciated that the pixel circuit 412B of FIG. 4B shares many similarities with the example pixel circuit 412A described in detail in FIG. 4A.

For instance, as shown in the example depicted in FIG. 4B, pixel circuit 412B includes a photodiode 418 configured to photogenerate charge or photocurrent in response to incident light, which may for example be the reflected modulated light 108 that is reflected from an object 106 as described in FIG. 1. A first floating diffusion FD 422A is configured to store a first portion of charge photogenerated in the photodiode 418, such as for example charge Q1 or Q3, and a second floating diffusion FD 422B is configured to store a second portion of charge photogenerated in the photodiode 418, such as for example charge Q2 or Q4.

A first transfer transistor 420A is configured to transfer the first portion of charge from the photodiode 418 to the first floating diffusion FD 422A in response to a first phase signal TXA, and a second transfer transistor 420B is configured to transfer the second portion of charge from the photodiode 418 to the second floating diffusion FD 422B in response to a second phase signal TXB. A first storage node MEM 444A is configured to store the first portion of charge from the first floating diffusion FD 422A, and a second storage node MEM 444B is configured to store the second portion of charge from the second floating diffusion FD 422B.

One of the differences between the example pixel circuit 412B shown FIG. 4B and the example pixel circuit 412A shown in FIG. 4A is that in the example pixel circuit 412B shown FIG. 4B, the first decoupling circuit 426A is illustrated as including a first transistor 438A having a drain (e.g., output OUT of first decoupling circuit 426A) coupled to the first storage node MEM 444A and a source (e.g., input IN of first decoupling circuit 426A) coupled to the first floating diffusion FD 422A. In the depicted example, the first transistor 438A is coupled to the first storage node MEM 444A through the first sample and hold transistor 428A. Similarly, the second decoupling circuit 426B is illustrated as including a second transistor 438B having a drain (e.g., output OUT of second decoupling circuit 426B) coupled to the second storage node MEM 444B and a source (e.g., input IN of second decoupling circuit 426B) coupled to the second floating diffusion FD 422B. In the depicted example, the second transistor 438B is coupled to the second storage node MEM 444B through the second sample and hold transistor 428B.

The example depicted in FIG. 4B also illustrates that the first decoupling circuit 426A further includes a first amplifier 436A having an input coupled to the first floating diffusion FD 422A and an output coupled to a gate of the first transistor 438A. Similarly, the second decoupling circuit 426B further includes a second amplifier 436B having an input coupled to the second floating diffusion FD 422B and an output coupled to a gate of the second transistor 438B. In the example, the first amplifier 436A and the second amplifier 436B are inverting amplifiers having a negative gain of −A.

As shown in the depicted example, the input of the first amplifier 436A is also coupled to the source of first transistor 438A, and the input of the second amplifier 436B is also coupled to the source of second transistor 438B. As such, a first feedback is provided to the first amplifier 436A through the source of first transistor 438A, and a second feedback is provided to the second amplifier 436A through the source of second transistor 438B. With the first feedback coupled to the input of the first amplifier 436A and the second feedback coupled to the input of the second amplifier 436B, it is appreciated that the potential differences between the first floating diffusion FD 422A and the second floating diffusion FD 422B are reduced, which reduces the impact of parasitic leakage currents between the nodes.

For instance, the feeding back of the source potential of the first and second transistors 438A and 438B to the inputs of the first and second amplifiers 436A and 436B, respectively, with the negative amplification—A to the gates of first and second transistors 438A and 438B, results in a dramatic reduction of the source potential sensitivity to the photocurrent generated by the photodiode 418, which is coupled to the first and second floating diffusions FD 422A and 422B through the respective transfer transistors 420A and 420B. The photocurrent generated by the photodiode 418 can still be measured at the output drain terminals of first and second transistors 438A and 438B, but now the source potentials of the first and second transistors 438A and 438B are decoupled from the drain terminals so that a larger voltage swing can be utilized on drain terminals of the first and second transistors 438A and 438B (e.g., the outputs OUT of the decoupling circuits 426A and 426B) while maintaining a minimal voltage swings at the source terminals of the first and second transistors 438A and 438B (e.g., the inputs IN of the decoupling circuits 426A and 426B).

It is appreciated that for a high gain—A for the first and second amplifiers 436A and 436B, the potentials at the first and second floating diffusions FD 422A and 432B converge the potentials at the source terminals of first and second transistors 438A and 438B. The photocurrent from photodiode 418 is passed through the first and second transistors 438A and 438B, and either drained through the first and second reset transistors 424A and 424B or are integrated through first and second sample and hold transistors 428A and 428B to the first and second memory nodes MEM 444A and 444B. Therefore, the voltages at the first and second memory nodes MEM 444A and 444B can now have a large voltage swing and hence, full well capacity (FWC) without compromising dark current related to the first and transfer transistors 420A and 420B. Moreover, due to the stable first and second floating diffusions FD 422A and 422B, potential leakage through a parasitic resistance between the first and second floating diffusions FD 422A and 422B is reduced, which increases modulation contrast in accordance with the teachings of the present invention.

Similar to the example pixel circuit 412A of FIG. 4A, the first storage node MEM 444A in the example pixel circuit 412B of FIG. 4B is coupled to a first capacitor 430A and a gate of a first source follower transistor 432A. A first row select transistor 434A is coupled to a source of the first source follower transistor 432A. In the various examples, the first row select transistor 434A is also coupled to a bit line, through which first output signal information may be read out from pixel circuit 412B. Similarly, the second storage node MEM 444B is coupled to a second capacitor 430B and a gate of a second source follower transistor 432B. A second row select transistor 434B is coupled to a source of the second source follower transistor 432B. In the various examples, the second row select transistor 434B is also coupled to a bit line, through which second output signal information may be read out from pixel circuit 412B.

As shown in the depicted example, pixel circuit 412B also includes a first reset transistor 424A coupled between a supply rail and the first decoupling circuit 426A. In particular, the example depicted in FIG. 4B shows first reset transistor 424A coupled to the drain of first transistor 438A. In various examples, first reset transistor 424A is configured to reset the first storage node MEM 444A and the first floating diffusion 422A in response to a reset signal RST. In the example depicted in FIG. 4B, the first reset transistor 424A may be configured to reset the first storage node MEM 444A through the first sample and hold transistor 428A, and the first floating diffusion FD 422A through the first transistor 438A.

Similarly, pixel circuit 412B also includes a second reset transistor 424B coupled between the supply rail and the second decoupling circuit 426B. In particular, the example depicted in FIG. 4B shows second reset transistor 424B coupled to the drain of second transistor 438B. In various examples, second reset transistor 424B is configured to reset the second storage node MEM 444B and the second floating diffusion 422B in response to the reset signal RST. In the example depicted in FIG. 4B, the second reset transistor 424A may be configured to reset the second storage node MEM 444B through the second sample and hold transistor 428B, and the second floating diffusion FD 422B through the second transistor 438B.

Figure 4C:
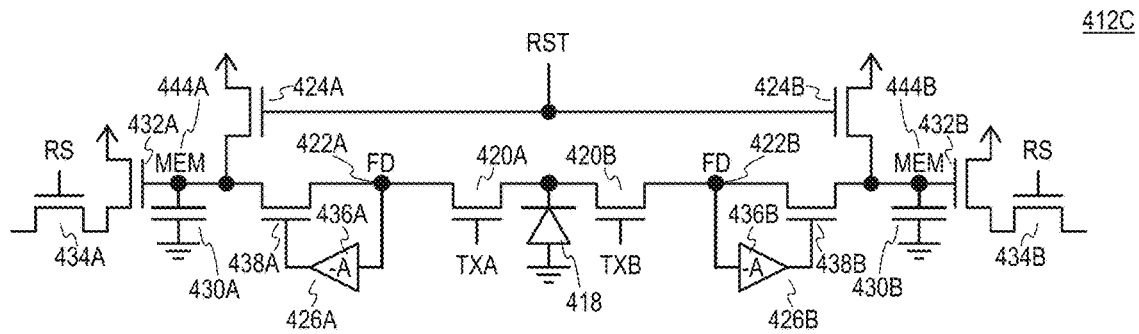
FIG. 4C is a schematic illustrating yet another example of a time-of-flight pixel in accordance with the teachings of the present invention.

FIG. 4C is a schematic illustrating yet another example of a time-of-flight pixel circuit 412C in accordance with the teachings of the present invention. It is appreciated the pixel circuit 412C of FIG. 4C may be another example of pixel circuit 412B as shown in FIG. 4B, or another example of pixel circuit 412A as shown in FIG. 4A, or another example of one of the pixel circuits 112 included in pixel array 110 shown in FIG. 1, and that similarly named and numbered elements described above are coupled and function similarly below. It is further appreciated that the pixel circuit 412C of FIG. 4C shares many similarities with the example pixel circuit 412B described in detail in FIG. 4B.

For instance, as shown in the example depicted in FIG. 4C, pixel circuit 412C includes a photodiode 418 configured to photogenerate charge or photocurrent in response to incident light, which may for example be the reflected modulated light 108 that is reflected from an object 106 as described in FIG. 1. A first floating diffusion FD 422A is configured to store a first portion of charge photogenerated in the photodiode 418, such as for example charge Q1 or Q3, and a second floating diffusion FD 422B is configured to store a second portion of charge photogenerated in the photodiode 418, such as for example charge Q2 or Q4.

A first transfer transistor 420A is configured to transfer the first portion of charge from the photodiode 418 to the first floating diffusion FD 422A in response to a first phase signal TXA, and a second transfer transistor 420B is configured to transfer the second portion of charge from the photodiode 418 to the second floating diffusion FD 422B in response to a second phase signal TXB. A first storage node MEM 444A is configured to store the first portion of charge from the first floating diffusion FD 422A, and a second storage node MEM 444B is configured to store the second portion of charge from the second floating diffusion FD 422B.

Similar to the example pixel circuit 412B shown FIG. 4B, the first decoupling circuit 426A in example pixel circuit 412C of FIG. 4C is illustrated as including a first transistor 438A having a drain (e.g., output OUT of first decoupling circuit 426A) coupled to the first storage node MEM 444A and a source (e.g., input IN of first decoupling circuit 426A) coupled to the first floating diffusion FD 422A. Similarly, the second decoupling circuit 426B is illustrated as including a second transistor 438B having a drain (e.g., output OUT of second decoupling circuit 426B) coupled to the second storage node MEM 444B and a source (e.g., input IN of second decoupling circuit 426B) coupled to the second floating diffusion FD 422B.

The example pixel circuit 412C depicted in FIG. 4C also shows that the first decoupling circuit 426A further includes a first amplifier 436A having an input coupled to the first floating diffusion FD 422A and an output coupled to a gate of the first transistor 438A. Similarly, the second decoupling circuit 426B further includes a second amplifier 436B having an input coupled to the second floating diffusion FD 422B and an output coupled to a gate of the second transistor 438B. In the example, the first amplifier 436A and the second amplifier 436B are inverting amplifiers having a negative gain of −A. As shown in the depicted example, the input of the first amplifier 436A is also coupled to the source of first transistor 438A, and the input of the second amplifier 436B is also coupled to the source of second transistor 438B. As such, a first feedback is provided to the first amplifier 436A through the source of first transistor 438A, and a second feedback is provided to the second amplifier 436A through the source of second transistor 438B.

Similar to the example pixel circuit 412B of FIG. 4B, the first storage node MEM 444A in the example pixel circuit 412C of FIG. 4C is coupled to a first capacitor 430A and a gate of a first source follower transistor 432A. A first row select transistor 434A is coupled to a source of the first source follower transistor 432A. In the various examples, the first row select transistor 434A is also coupled to a bit line, through which first output signal information may be read out from pixel circuit 412C. Similarly, the second storage node MEM 444B is coupled to a second capacitor 430B and a gate of a second source follower transistor 432B. A second row select transistor 434B is coupled to a source of the second source follower transistor 432B. In the various examples, the second row select transistor 434B is also coupled to a bit line, through which second output signal information may be read out from pixel circuit 412C.

As shown in the depicted example, pixel circuit 412C also includes a first reset transistor 424A coupled between a supply rail and the first decoupling circuit 426A. In particular, the example depicted in FIG. 4C shows first reset transistor 424A coupled to the drain of first transistor 438A. Similarly, pixel circuit 412C also includes a second reset transistor 424B coupled between the supply rail and the second decoupling circuit 426B. In particular, the example depicted in FIG. 4C shows second reset transistor 424B coupled to the drain of second transistor 438B.

One of the differences between the example pixel circuit 412C of FIG. 4C and the example pixel circuit 412B of FIG. 4B is that the example pixel circuit 412C of FIG. 4C does not include first and second sample and hold circuits 428A and 428B coupled between the outputs of the first and second decoupling circuits 426A and 426B and the first and second storage nodes MEM 444A and 444B.

In various examples, the first reset transistor 424A is configured to reset the first floating diffusion FD 422A as well the first storage node MEM 444A in response to a reset signal RST, and the second reset transistor 424B is configured to reset the second floating diffusion FD 422B as well the second storage node MEM 444B in response to the reset signal RST. In the example depicted in FIG. 4C, the first reset transistor 424A may be configured to reset the first floating diffusion FD 422A through the first transistor 438A, and the second reset transistor 424B is configured to reset the second floating diffusion FD 422B through the second transistor 438B.

Figure 4D:
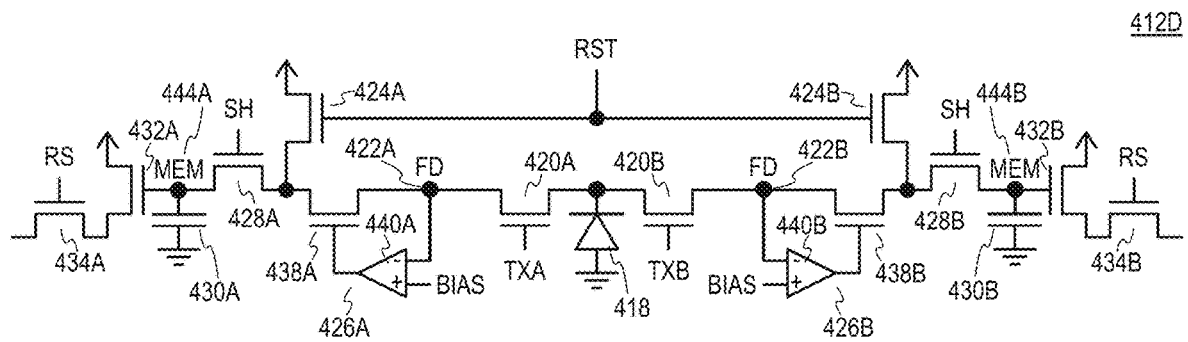
FIG. 4D is a schematic illustrating still another example of a time-of-flight pixel in accordance with the teachings of the present invention.

FIG. 4D is a schematic illustrating still another example of a time-of-flight pixel circuit 412D in accordance with the teachings of the present invention. It is appreciated the pixel circuit 412D of FIG. 4D may be another example of pixel circuit 412C as shown in FIG. 4C, or another example of pixel circuit 412B as shown in FIG. 4B, or another example of pixel circuit 412A as shown in FIG. 4A, or another example of one of the pixel circuits 112 included in pixel array 110 shown in FIG. 1, and that similarly named and numbered elements described above are coupled and function similarly below. It is further appreciated that the pixel circuit 412D of FIG. 4D shares many similarities with the example pixel circuit 412B described in detail in FIG. 4B.

For instance, as shown in the example depicted in FIG. 4D, pixel circuit 412D includes a photodiode 418 configured to photogenerate charge or photocurrent in response to incident light, which may for example be the reflected modulated light 108 that is reflected from an object 106 as described in FIG. 1. A first floating diffusion FD 422A is configured to store a first portion of charge photogenerated in the photodiode 418, such as for example charge Q1 or Q3, and a second floating diffusion FD 422B is configured to store a second portion of charge photogenerated in the photodiode 418, such as for example charge Q2 or Q4.

A first transfer transistor 420A is configured to transfer the first portion of charge from the photodiode 418 to the first floating diffusion FD 422A in response to a first phase signal TXA, and a second transfer transistor 420B is configured to transfer the second portion of charge from the photodiode 418 to the second floating diffusion FD 422B in response to a second phase signal TXB. A first storage node MEM 444A is configured to store the first portion of charge from the first floating diffusion FD 422A, and a second storage node MEM 444B is configured to store the second portion of charge from the second floating diffusion FD 422B.

Similar to the example pixel circuit 412B shown FIG. 4B, the first decoupling circuit 426A in example pixel circuit 412D of FIG. 4D is illustrated as including a first transistor 438A having a drain (e.g., output OUT of first decoupling circuit 426A) coupled to the first storage node MEM 444A and a source (e.g., input IN of first decoupling circuit 426A) coupled to the first floating diffusion FD 422A. In the depicted example, the first transistor 438A is coupled to the first storage node MEM 444A through the first sample and hold transistor 428A. Similarly, the second decoupling circuit 426B is illustrated as including a second transistor 438B having a drain (e.g., output OUT of second decoupling circuit 426B) coupled to the second storage node MEM 444B and a source (e.g., input IN of second decoupling circuit 426B) coupled to the second floating diffusion FD 422B. In the depicted example, the second transistor 438B is coupled to the second storage node MEM 444B through the second sample and hold transistor 428B.

One of the differences between the example pixel circuit 412D shown FIG. 4D and the example pixel circuit 412B shown in FIG. 4B is that in the example pixel circuit 412D shown FIG. 4D, the first decoupling circuit 426A further includes a first amplifier 440A, which is a differential amplifier or an operational amplifier having an inverting input coupled to the first floating diffusion FD 422A, a non-inverting input coupled to receive a bias voltage BIAS, and an output coupled to a gate of the first transistor 438A. Similarly, the second decoupling circuit 426B further includes a second amplifier 440B, which is a differential amplifier or an operational amplifier having an inverting input coupled to the second floating diffusion FD 422B, a non-inverting input coupled to receive the bias voltage BIAS, and an output coupled to a gate of the second transistor 438B.

As shown in the depicted example, the inverting input of the first amplifier 440A is also coupled to the source of first transistor 438A, and the inverting input of the second amplifier 440B is also coupled to the source of second transistor 438B. As such, a first feedback is provided to the first amplifier 440A through the source of first transistor 438A, and a second feedback is provided to the second amplifier 440A through the source of second transistor 438B. With the first feedback coupled to the inverting input of the first amplifier 440A and the second feedback coupled to inverting input of the second amplifier 440B, it is appreciated that the potential differences between the first floating diffusion FD 422A and the second floating diffusion FD 422B are reduced, which reduces the impact of parasitic leakage currents between the nodes.

It is further appreciated that with the first and second amplifiers 440A and 440B implemented with differential or operational amplifiers as shown in FIG. 4D, more robust control of the floating diffusion FD 422A and 422B potentials is enabled, but with the tradeoff of a larger footprint. As shown, the gates of the first and second transistors 438A and 438B are driven by the outputs of the first and second amplifiers 440A and 440B. With the inverting inputs of the first and second amplifiers 440A and 440B coupled to the corresponding first and second floating diffusions FD 422A and 422B and the sources of the first and second transistors 438A and 438B, negative feedback is established, while the non-inverting inputs of the first and second amplifiers 440A and 440B are coupled to the bias voltage BIAS.

Similar to the example pixel circuit 412B of FIG. 4B, the first storage node MEM 444A in the example pixel circuit 412D of FIG. 4D is coupled to a first capacitor 430A and a gate of a first source follower transistor 432A. A first row select transistor 434A is coupled to a source of the first source follower transistor 432A. In the various examples, the first row select transistor 434A is also coupled to a bit line, through which first output signal information may be read out from pixel circuit 412D. Similarly, the second storage node MEM 444B is coupled to a second capacitor 430B and a gate of a second source follower transistor 432B. A second row select transistor 434B is coupled to a source of the second source follower transistor 432B. In the various examples, the second row select transistor 434B is also coupled to a bit line, through which second output signal information may be read out from pixel circuit 412D.

As shown in the depicted example, pixel circuit 412D also includes a first reset transistor 424A coupled between a supply rail and the first decoupling circuit 426A. In particular, the example depicted in FIG. 4D shows first reset transistor 424A coupled to the drain of first transistor 438A. In various examples, first reset transistor 424A is configured to reset the first floating diffusion FD 422A as well the first storage node MEM 444A in response to a reset signal RST. In the example depicted in FIG. 4D, the first reset transistor 424A may be configured to reset the first storage node MEM 444A through first sample and hold transistor 428A, and the first floating diffusion FD 422A through the first transistor 438A.

Similarly, pixel circuit 412D also includes a second reset transistor 424B coupled between the supply rail and the second decoupling circuit 426B. In particular, the example depicted in FIG. 4D shows second reset transistor 424B coupled to the drain of second transistor 438B. In various examples, second reset transistor 424B is configured to reset the second floating diffusion FD 422B as well as the second storage node MEM 444B in response to the reset signal RST. In the example depicted in FIG. 4D, the second reset transistor 424B is configured to reset the second storage node MEM 444B through second sample and hold transistor 428B, and the second floating diffusion FD 422B through the second transistor 438B.

In one example, during a reset mode a high potential bias voltage may be applied to the non-inverting inputs of the first and second amplifiers 440A and 440B to create a high output at the gates of the decoupling first and second transistors 438A and 438B resulting in operation in a triode mode to enable the reset of the first and second floating diffusions FD 422A and 422B through the first and second reset transistors 424A and 424B. During a decoupling period, the potential at the non-inverting inputs of the first and second amplifiers 440A and 440B may then be lowered to achieve saturation of the decoupling first and second transistors 438A and 438B.

Figure 4E:
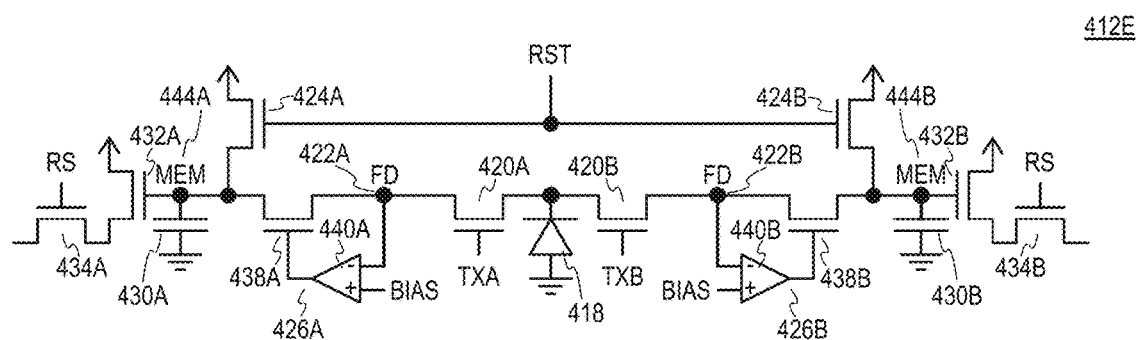
FIG. 4E is a schematic illustrating yet another example of a time-of-flight pixel in accordance with the teachings of the present invention.

FIG. 4E is a schematic illustrating yet another example of a time-of-flight pixel circuit 412E in accordance with the teachings of the present invention. It is appreciated the pixel circuit 412E of FIG. 4E may be another example of pixel circuit 412D as shown in FIG. 4D, or another example of 412C as shown in FIG. 4C, or another example of pixel circuit 412B as shown in FIG. 4B, or another example of 412A as shown in FIG. 4A, or another example of one of the pixel circuits 112 included in pixel array 110 shown in FIG. 1, and that similarly named and numbered elements described above are coupled and function similarly below. It is further appreciated that the pixel circuit 412E of FIG. 4E shares many similarities with the example pixel circuit 412C described in detail in FIG. 4C.

For instance, as shown in the example depicted in FIG. 4E, pixel circuit 412E includes a photodiode 418 configured to photogenerate charge or photocurrent in response to incident light, which may for example be the reflected modulated light 108 that is reflected from an object 106 as described in FIG. 1. A first floating diffusion FD 422A is configured to store a first portion of charge photogenerated in the photodiode 418, such as for example charge Q1 or Q3, and a second floating diffusion FD 422B is configured to store a second portion of charge photogenerated in the photodiode 418, such as for example charge Q2 or Q4.

A first transfer transistor 420A is configured to transfer the first portion of charge from the photodiode 418 to the first floating diffusion FD 422A in response to a first phase signal TXA, and a second transfer transistor 420B is configured to transfer the second portion of charge from the photodiode 418 to the second floating diffusion FD 422B in response to a second phase signal TXB. A first storage node MEM 444A is configured to store the first portion of charge from the first floating diffusion FD 422A, and a second storage node MEM 444B is configured to store the second portion of charge from the second floating diffusion FD 422B.

Similar to the example pixel circuit 412C shown FIG. 4C, the first decoupling circuit 426A in example pixel circuit 412E of FIG. 4E is illustrated as including a first transistor 438A having a drain (e.g., output OUT of first decoupling circuit 426A) coupled to the first storage node MEM 444A and a source (e.g., input IN of first decoupling circuit 426A) coupled to the first floating diffusion FD 422A. Similarly, the second decoupling circuit 426B is illustrated as including a second transistor 438B having a drain (e.g., output OUT of second decoupling circuit 426B) coupled to the second storage node MEM 444B and a source (e.g., input IN of second decoupling circuit 426B) coupled to the second floating diffusion FD 422B.

One of the differences between the example pixel circuit 412E shown FIG. 4E and the example pixel circuit 412C shown in FIG. 4C is that in the example pixel circuit 412E shown FIG. 4E, the first decoupling circuit 426A further includes a first amplifier 440A, which is a differential amplifier or an operational amplifier having an inverting input coupled to the first floating diffusion FD 422A, a non-inverting input coupled to receive a bias voltage BIAS, and an output coupled to a gate of the first transistor 438A. Similarly, the second decoupling circuit 426B further includes a second amplifier 440B, which is a differential amplifier or an operational amplifier having an inverting input coupled to the second floating diffusion FD 422B, a non-inverting input coupled to receive the bias voltage BIAS, and an output coupled to a gate of the second transistor 438B.

As shown in the depicted example, the inverting input of the first amplifier 440A is also coupled to the source of first transistor 438A, and the inverting input of the second amplifier 440B is also coupled to the source of second transistor 438B. As such, a first feedback is provided to the first amplifier 440A through the source of first transistor 438A, and a second feedback is provided to the second amplifier 440A through the source of second transistor 438B. With the first feedback coupled to the inverting input of the first amplifier 440A and the second feedback coupled to inverting input of the second amplifier 440B, it is appreciated that the potential differences between the first floating diffusion FD 422A and the second floating diffusion FD 422B are reduced, which reduces the impact of parasitic leakage currents between the nodes.

It is further appreciated that with the first and second amplifiers 440A and 440B implemented with differential or operational amplifiers as shown in FIG. 4E, more robust control of the floating diffusion FD 422A and 422B potentials is enabled, but with the tradeoff of a larger footprint. As shown, the gates of the first and second transistors 438A and 438B are driven by the outputs of the first and second amplifiers 440A and 440B. With the inverting inputs of the first and second amplifiers 440A and 440B coupled to the corresponding first and second floating diffusions FD 422A and 422B and the sources of the first and second transistors 438A and 438B, negative feedback is established, while the non-inverting inputs of the first and second amplifiers 440A and 440B are coupled to the bias voltage BIAS.

Similar to the example pixel circuit 412C of FIG. 4C, the first storage node MEM 444A in the example pixel circuit 412E of FIG. 4E is coupled to a first capacitor 430A and a gate of a first source follower transistor 432A. A first row select transistor 434A is coupled to a source of the first source follower transistor 432A. In the various examples, the first row select transistor 434A is also coupled to a bit line, through which first output signal information may be read out from pixel circuit 412E. Similarly, the second storage node MEM 444B is coupled to a second capacitor 430B and a gate of a second source follower transistor 432B. A second row select transistor 434B is coupled to a source of the second source follower transistor 432B. In the various examples, the second row select transistor 434B is also coupled to a bit line, through which second output signal information may be read out from pixel circuit 412E.

As shown in the depicted example, pixel circuit 412E also includes a first reset transistor 424A coupled between a supply rail and the first decoupling circuit 426A. In particular, the example depicted in FIG. 4E shows first reset transistor 424A coupled to the drain of first transistor 438A. Similarly, pixel circuit 412E also includes a second reset transistor 424B coupled between the supply rail and the second decoupling circuit 426B. In particular, the example depicted in FIG. 4E shows second reset transistor 424B coupled to the drain of second transistor 438B.

Similar to the example pixel circuit 412C of FIG. 4C, the example pixel circuit 412E of FIG. 4E does not include first and second sample and hold circuits 428A and 428B coupled between the outputs of the first and second decoupling circuits 426A and 426B and the first and second storage nodes MEM 444A and 444B.

In various examples, the first reset transistor 424A is configured to reset the first floating diffusion FD 422A as well the first storage node MEM 444A in response to a reset signal RST, and the second reset transistor 424B is configured to reset the second floating diffusion FD 422B as well the second storage node MEM 444B in response to the reset signal RST. In the example depicted in FIG. 4E, the first reset transistor 424A may be configured to reset the first floating diffusion FD 422A through the first transistor 438A, and the second reset transistor 424B is configured to reset the second floating diffusion FD 422B through the second transistor 438B.

In one example, during a reset mode a high potential bias voltage may be applied to the non-inverting inputs of the first and second amplifiers 440A and 440B to create a high output at the gates of the decoupling first and second transistors 438A and 438B resulting in operation in a triode mode to enable the reset of the first and second floating diffusions FD 422A and 422B through the first and second reset transistors 424A and 424B. During a decoupling period, the potential at the non-inverting inputs of the first and second amplifiers 440A and 440B may then be lowered to achieve saturation of the decoupling first and second transistors 438A and 438B.

Figure 5A:
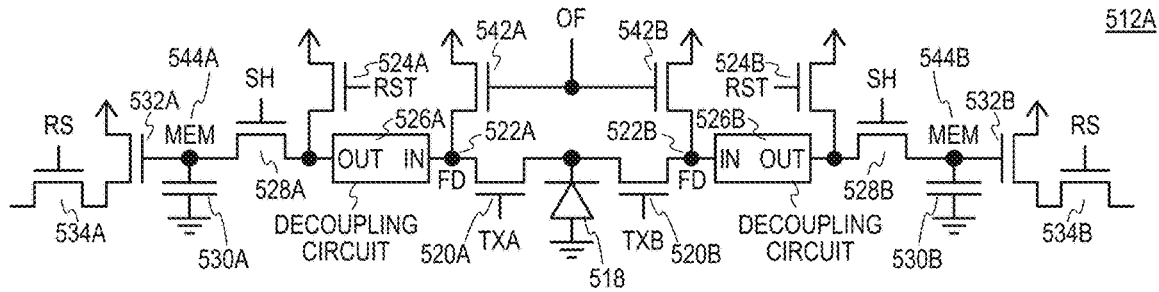
FIG. 5A is a schematic illustrating an example of a time-of-flight pixel in accordance with the teachings of the present invention.

FIG. 5A is a schematic illustrating another example of a time-of-flight pixel circuit 512A in accordance with the teachings of the present invention. It is appreciated the pixel circuit 512A of FIG. 5A may be another example of pixel circuit 412A as shown in FIG. 4A, or another example of pixel circuit 312A as shown in FIG. 3A, or another example of one of the pixel circuits 112 included in pixel array 110 shown in FIG. 1, and that similarly named and numbered elements described above are coupled and function similarly below. It is further appreciated that the pixel circuit 512A of FIG. 5A shares many similarities with the example pixel circuit 412A described in detail in FIG. 4A.

For instance, as shown in the example depicted in FIG. 5A, pixel circuit 512A includes a photodiode 518 configured to photogenerate charge or photocurrent in response to incident light, which may for example be the reflected modulated light 108 that is reflected from an object 106 as described in FIG. 1. A first floating diffusion FD 522A is configured to store a first portion of charge photogenerated in the photodiode 518, such as for example charge Q1 or Q3, and a second floating diffusion FD 522B is configured to store a second portion of charge photogenerated in the photodiode 518, such as for example charge Q2 or Q4.

A first transfer transistor 520A is configured to transfer the first portion of charge from the photodiode 518 to the first floating diffusion FD 522A in response to a first phase signal TXA, and a second transfer transistor 520B is configured to transfer the second portion of charge from the photodiode 518 to the second floating diffusion FD 522B in response to a second phase signal TXB. A first storage node MEM 544A is configured to store the first portion of charge from the first floating diffusion FD 522A, and a second storage node MEM 544B is configured to store the second portion of charge from the second floating diffusion FD 522B.

As shown in the depicted example, a first decoupling circuit 526A has an output OUT and an input IN. In the various examples, the output OUT of first decoupling circuit 526A is responsive to the input IN of first decoupling circuit 526A. As shown in the example, the input IN of first decoupling circuit 526A is coupled to the first floating diffusion FD 522A, and the output OUT of first decoupling circuit 526A is coupled to first storage node MEM 544A. In the example depicted in FIG. 5A, the output OUT of first decoupling circuit 526A is coupled to first storage node MEM 544A through a first sample and hold transistor 528A. In the various examples, a voltage swing at the output OUT of first decoupling circuit 526A is greater than a voltage swing at the input IN of first decoupling circuit 526A. As such, it is appreciated that a higher voltage swing is therefore allowed at the first storage node MEM 544A, which therefore allows for an increased full well capacity (FWC) at the first floating diffusion FD 522A while limiting the overdrive on the first floating diffusion FD 522A and hence reducing dark current in accordance with the teachings of the present invention.

Similarly, the example depicted in FIG. 5A also shows a second decoupling circuit 526B that has an output OUT and an input IN. In the various examples, the output OUT of second decoupling circuit 526B is responsive to the input IN of second decoupling circuit 526B. As shown in the example, the input IN of second decoupling circuit 526B is coupled to the second floating diffusion FD 522B, and the output OUT of second decoupling circuit 526B is coupled to second storage node MEM 544B. In the example depicted in FIG. 5A, the output OUT of second decoupling circuit 526B is coupled to second storage node MEM 544B through a second sample and hold transistor 528B. In the various examples, the voltage swing at the output OUT of second decoupling circuit 526B is greater than the voltage swing at the input IN of second decoupling circuit 526B. As such, a higher voltage swing is therefore also allowed at the second storage node MEM 544B, which therefore also allows for an increased full well capacity (FWC) at the second floating diffusion FD 522B while limiting the overdrive on the second floating diffusion FD 522B and hence reducing dark current in accordance with the teachings of the present invention.

In the illustrated example, the first storage node MEM 544A is coupled to a first capacitor 530A and a gate of a first source follower transistor 532A. A first row select transistor 534A is coupled to a source of the first source follower transistor 532A. In the various examples, the first row select transistor 534A is also coupled to a bit line, through which first output signal information may be read out from pixel circuit 512A. Similarly, the second storage node MEM 544B is coupled to a second capacitor 530B and a gate of a second source follower transistor 532B. A second row select transistor 534B is coupled to a source of the second source follower transistor 532B. In the various examples, the second row select transistor 534B is also coupled to a bit line, through which second output signal information may be read out from pixel circuit 512A.

In the various examples, pixel circuit 512A also includes a first reset transistor 524A coupled between a supply rail and the first decoupling circuit 526A. In addition, pixel circuit 512A also includes a second reset transistor 524B coupled between the supply rail and the second decoupling circuit 526B.

Similar to pixel circuit 412A of FIG. 4A, the first reset transistor 524A included in pixel circuit 512A of FIG. 5A is coupled to the output OUT of first decoupling circuit 526A. In various examples, first reset transistor 524A is configured to reset the first floating diffusion FD 522A as well the first storage node MEM 544A in response to a reset signal RST. In the example depicted in FIG. 5A, the first reset transistor 524A is configured to reset the first storage node MEM 544A through first sample and hold transistor 528A, and the first floating diffusion 522A through the first decoupling circuit 526A.

Similarly, the second reset transistor 524B of example pixel circuit 512A of FIG. 5A is coupled to the output OUT of second decoupling circuit 526B. In various examples, second reset transistor 524B is configured to reset the first floating diffusion FD 522A as well the first storage node MEM 544A in response to the reset signal RST. In the example depicted in FIG. 5A, the second reset transistor 524B is configured to reset the second storage node MEM 544B through second sample and hold transistor 528B, and the second floating diffusion 522B through the second decoupling circuit 526B.

One of the differences between pixel circuit 512A of FIG. 5A and pixel circuit 412A of FIG. 4A is that pixel circuit 512A of FIG. 5A further includes a first overflow transistor 542A coupled between the supply rail and the first floating diffusion FD 522A as well as a second overflow transistor 542B coupled between the supply rail and the second floating diffusion FD 522B. In the various examples, the first and second overflow transistors 542A and 542B are switched in response to an overflow signal OF as shown.

Therefore, it is appreciated that photocurrent from photodiode 518 is either guided to the first and second storage nodes MEM 544A and 544B, or to the supply rail through the first and second reset transistors 524A and 524B through the first and second decoupling circuits 526A and 526B, or to the supply rail through the first and second overflow transistors 542A and 542B in pixel circuit 512A.

Figure 5B:
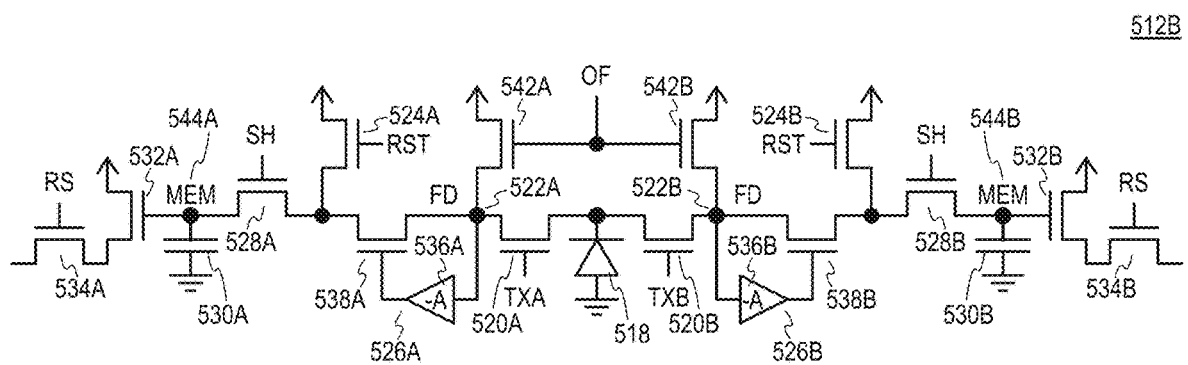
FIG. 5B is a schematic illustrating another example of a time-of-flight pixel in accordance with the teachings of the present invention.

FIG. 5B is a schematic illustrating another example of a time-of-flight pixel circuit 512B in accordance with the teachings of the present invention. It is appreciated the pixel circuit 512B of FIG. 5B may be another example of pixel circuit 512A as shown in FIG. 5A, or another example of one of the pixel circuits 112 included in pixel array 110 shown in FIG. 1, and that similarly named and numbered elements described above are coupled and function similarly below. It is further appreciated that the pixel circuit 512B of FIG. 5B shares many similarities with the example pixel circuit 512A described in detail in FIG. 5A.

For instance, as shown in the example depicted in FIG. 5B, pixel circuit 512B includes a photodiode 518 configured to photogenerate charge or photocurrent in response to incident light, which may for example be the reflected modulated light 108 that is reflected from an object 106 as described in FIG. 1. A first floating diffusion FD 522A is configured to store a first portion of charge photogenerated in the photodiode 518, such as for example charge Q1 or Q3, and a second floating diffusion FD 522B is configured to store a second portion of charge photogenerated in the photodiode 518, such as for example charge Q2 or Q4.

A first transfer transistor 520A is configured to transfer the first portion of charge from the photodiode 518 to the first floating diffusion FD 522A in response to a first phase signal TXA, and a second transfer transistor 520B is configured to transfer the second portion of charge from the photodiode 518 to the second floating diffusion FD 522B in response to a second phase signal TXB. A first storage node MEM 544A is configured to store the first portion of charge from the first floating diffusion FD 522A, and a second storage node MEM 544B is configured to store the second portion of charge from the second floating diffusion FD 522B.

One of the differences between the example pixel circuit 512B shown FIG. 5B and the example pixel circuit 512A shown in FIG. 5A is that in the example pixel circuit 512B shown FIG. 5B, the first decoupling circuit 526A is illustrated as including a first transistor 538A having a drain (e.g., output OUT of first decoupling circuit 526A) coupled to the first storage node MEM 544A and a source (e.g., input IN of first decoupling circuit 526A) coupled to the first floating diffusion FD 522A. In the depicted example, the first transistor 538A is coupled to the first storage node MEM 544A through the first sample and hold transistor 528A. Similarly, the second decoupling circuit 526B is illustrated as including a second transistor 538B having a drain (e.g., output OUT of second decoupling circuit 526B) coupled to the second storage node MEM 544B and a source (e.g., input IN of second decoupling circuit 526B) coupled to the second floating diffusion FD 522B. In the depicted example, the second transistor 538B is coupled to the second storage node MEM 544B through the second sample and hold transistor 528B.

The example depicted in FIG. 5B also illustrates that the first decoupling circuit 526A further includes a first amplifier 536A having an input coupled to the first floating diffusion FD 522A and an output coupled to a gate of the first transistor 538A. Similarly, the second decoupling circuit 526B further includes a second amplifier 536B having an input coupled to the second floating diffusion FD 522B and an output coupled to a gate of the second transistor 538B. In the example, the first amplifier 536A and the second amplifier 536B are inverting amplifiers having a negative gain of −A.

As shown in the depicted example, the input of the first amplifier 536A is also coupled to the source of first transistor 538A, and the input of the second amplifier 536B is also coupled to the source of second transistor 538B. As such, a first feedback is provided to the first amplifier 536A through the source of first transistor 538A, and a second feedback is provided to the second amplifier 536A through the source of second transistor 538B. With the first feedback coupled to the input of the first amplifier 536A and the second feedback coupled to the input of the second amplifier 536B, it is appreciated that the potential differences between the first floating diffusion FD 522A and the second floating diffusion FD 522B are reduced, which reduces the impact of parasitic leakage currents between the nodes.

For instance, the feeding back of the source potential of the first and second transistors 538A and 538B to the inputs of the first and second amplifiers 536A and 536B, respectively, with the negative amplification—A to the gates of first and second transistors 538A and 538B, results in a dramatic reduction of the source potential sensitivity to the photocurrent generated by the photodiode 518, which is coupled to the first and second floating diffusions FD 522A and 522B through the respective transfer transistors 520A and 520B. The photocurrent generated by the photodiode 518 can still be measured at the output drain terminals of first and second transistors 538A and 538B, but now the source potentials of the first and second transistors 538A and 538B are decoupled from the drain terminals so that a larger voltage swing can be utilized on drain terminals of the first and second transistors 538A and 538B (e.g., the outputs OUT of the decoupling circuits 526A and 526B) while maintaining a minimal voltage swings at the source terminals of the first and second transistors 538A and 538B (e.g., the inputs IN of the decoupling circuits 526A and 526B).

It is appreciated that for a high gain—A for the first and second amplifiers 536A and 536B, the potentials at the first and second floating diffusions FD 522A and 532B converge the potentials at the source terminals of first and second transistors 538A and 538B. Therefore, the voltages at the first and second memory nodes MEM 544A and 544B can now have a large voltage swing and hence, full well capacity (FWC) without compromising dark current related to the first and transfer transistors 520A and 520B. Moreover, due to the stable first and second floating diffusions FD 522A and 522B, potential leakage through a parasitic resistance between the first and second floating diffusions FD 522A and 522B is reduced, which increases modulation contrast in accordance with the teachings of the present invention.

Similar to the example pixel circuit 512A of FIG. 5A, the first storage node MEM 544A in the example pixel circuit 512B of FIG. 5B is coupled to a first capacitor 530A and a gate of a first source follower transistor 532A. A first row select transistor 534A is coupled to a source of the first source follower transistor 532A. In the various examples, the first row select transistor 534A is also coupled to a bit line, through which first output signal information may be read out from pixel circuit 512B. Similarly, the second storage node MEM 544B is coupled to a second capacitor 530B and a gate of a second source follower transistor 532B. A second row select transistor 534B is coupled to a source of the second source follower transistor 532B. In the various examples, the second row select transistor 534B is also coupled to a bit line, through which second output signal information may be read out from pixel circuit 512B.

As shown in the depicted example, pixel circuit 512B also includes a first reset transistor 524A coupled between a supply rail and the first decoupling circuit 526A. In particular, the example depicted in FIG. 5B shows first reset transistor 524A coupled to the drain of first transistor 538A. In various examples, first reset transistor 524A is configured to reset the first storage node MEM 544A and the first floating diffusion 522A in response to a reset signal RST. In the example depicted in FIG. 5B, the first reset transistor 524A may be configured to reset the first storage node MEM 544A through the first sample and hold transistor 528A, and the first floating diffusion FD 522A through the first transistor 538A.

Similarly, pixel circuit 512B also includes a second reset transistor 524B coupled between the supply rail and the second decoupling circuit 526B. In particular, the example depicted in FIG. 5B shows second reset transistor 524B coupled to the drain of second transistor 538B. In various examples, second reset transistor 524B is configured to reset the second storage node MEM 544B and the second floating diffusion 522B in response to the reset signal RST. In the example depicted in FIG. 5B, the second reset transistor 524A may be configured to reset the second storage node MEM 544B through the second sample and hold transistor 528B, and the second floating diffusion FD 422B through the second transistor 538B.

Similar to pixel circuit 512A of FIG. 5A, pixel circuit 512B of FIG. 5B further includes a first overflow transistor 542A coupled between the supply rail and the first floating diffusion FD 522A as well as a second overflow transistor 542B coupled between the supply rail and the second floating diffusion FD 522B. In the various examples, the first and second overflow transistors 542A and 542B are switched in response to an overflow signal OF as shown.

Therefore, it is appreciated that photocurrent from photodiode 518 is either guided to the first and second storage nodes MEM 544A and 544B, or to the supply rail through the first and second reset transistors 524A and 524B through the first and second decoupling circuits 526A and 526B, or to the supply rail through the first and second overflow transistors 542A and 542B in pixel circuit 512B.

Figure 5C:
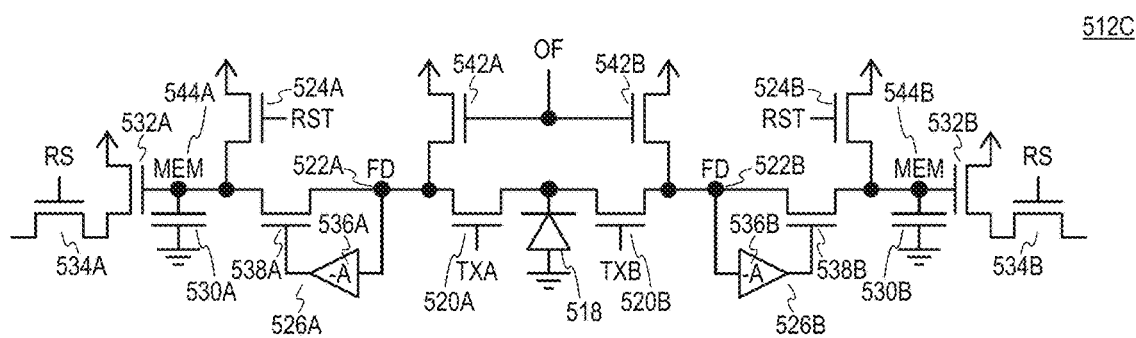
FIG. 5C is a schematic illustrating yet another example of a time-of-flight pixel in accordance with the teachings of the present invention.

FIG. 5C is a schematic illustrating yet another example of a time-of-flight pixel circuit 512C in accordance with the teachings of the present invention. It is appreciated the pixel circuit 512C of FIG. 5C may be another example of pixel circuit 512B as shown in FIG. 5B, or another example of pixel circuit 512A as shown in FIG. 5A, or another example of one of the pixel circuits 112 included in pixel array 110 shown in FIG. 1, and that similarly named and numbered elements described above are coupled and function similarly below. It is further appreciated that the pixel circuit 512C of FIG. 5C shares many similarities with the example pixel circuit 512B described in detail in FIG. 5B.

For instance, as shown in the example depicted in FIG. 5C, pixel circuit 512C includes a photodiode 518 configured to photogenerate charge or photocurrent in response to incident light, which may for example be the reflected modulated light 108 that is reflected from an object 106 as described in FIG. 1. A first floating diffusion FD 522A is configured to store a first portion of charge photogenerated in the photodiode 518, such as for example charge Q1 or Q3, and a second floating diffusion FD 522B is configured to store a second portion of charge photogenerated in the photodiode 518, such as for example charge Q2 or Q4.

A first transfer transistor 520A is configured to transfer the first portion of charge from the photodiode 518 to the first floating diffusion FD 522A in response to a first phase signal TXA, and a second transfer transistor 520B is configured to transfer the second portion of charge from the photodiode 518 to the second floating diffusion FD 522B in response to a second phase signal TXB. A first storage node MEM 544A is configured to store the first portion of charge from the first floating diffusion FD 522A, and a second storage node MEM 544B is configured to store the second portion of charge from the second floating diffusion FD 522B.

Similar to the example pixel circuit 512B shown FIG. 5B, the first decoupling circuit 526A in example pixel circuit 512C of FIG. 5C is illustrated as including a first transistor 538A having a drain (e.g., output OUT of first decoupling circuit 526A) coupled to the first storage node MEM 544A and a source (e.g., input IN of first decoupling circuit 526A) coupled to the first floating diffusion FD 522A. Similarly, the second decoupling circuit 526B is illustrated as including a second transistor 538B having a drain (e.g., output OUT of second decoupling circuit 526B) coupled to the second storage node MEM 544B and a source (e.g., input IN of second decoupling circuit 526B) coupled to the second floating diffusion FD 522B.

The example pixel circuit 512C depicted in FIG. 5C also shows that the first decoupling circuit 526A further includes a first amplifier 536A having an input coupled to the first floating diffusion FD 522A and an output coupled to a gate of the first transistor 538A. Similarly, the second decoupling circuit 526B further includes a second amplifier 536B having an input coupled to the second floating diffusion FD 522B and an output coupled to a gate of the second transistor 538B. In the example, the first amplifier 536A and the second amplifier 536B are inverting amplifiers having a negative gain of −A. As shown in the depicted example, the input of the first amplifier 536A is also coupled to the source of first transistor 538A, and the input of the second amplifier 536B is also coupled to the source of second transistor 538B. As such, a first feedback is provided to the first amplifier 536A through the source of first transistor 538A, and a second feedback is provided to the second amplifier 536A through the source of second transistor 538B.

Similar to the example pixel circuit 512B of FIG. 5B, the first storage node MEM 544A in the example pixel circuit 512C of FIG. 5C is coupled to a first capacitor 530A and a gate of a first source follower transistor 532A. A first row select transistor 534A is coupled to a source of the first source follower transistor 532A. In the various examples, the first row select transistor 534A is also coupled to a bit line, through which first output signal information may be read out from pixel circuit 512C. Similarly, the second storage node MEM 544B is coupled to a second capacitor 530B and a gate of a second source follower transistor 532B. A second row select transistor 534B is coupled to a source of the second source follower transistor 532B. In the various examples, the second row select transistor 534B is also coupled to a bit line, through which second output signal information may be read out from pixel circuit 512C.

As shown in the depicted example, pixel circuit 512C also includes a first reset transistor 524A coupled between a supply rail and the first decoupling circuit 526A. In particular, the example depicted in FIG. 5C shows first reset transistor 524A coupled to the drain of first transistor 538A. Similarly, pixel circuit 512C also includes a second reset transistor 524B coupled between the supply rail and the second decoupling circuit 526B. In particular, the example depicted in FIG. 5C shows second reset transistor 524B coupled to the drain of second transistor 538B.

One of the differences between the example pixel circuit 512C of FIG. 5C and the example pixel circuit 512B of FIG. 5B is that the example pixel circuit 512C of FIG. 5C does not include first and second sample and hold circuits 528A and 528B coupled between the outputs of the first and second decoupling circuits 526A and 526B and the first and second storage nodes MEM 544A and 544B.

In various examples, the first reset transistor 524A is configured to reset the first floating diffusion FD 522A as well the first storage node MEM 544A in response to a reset signal RST, and the second reset transistor 524B is configured to reset the second floating diffusion FD 522B as well the second storage node MEM 544B in response to the reset signal RST. In the example depicted in FIG. 5C, the first reset transistor 524A may be configured to reset the first floating diffusion FD 522A through the first transistor 538A, and the second reset transistor 524B is configured to reset the second floating diffusion FD 522B through the second transistor 538B.

Similar to pixel circuit 512B of FIG. 5B, pixel circuit 512C of FIG. 5C further includes a first overflow transistor 542A coupled between the supply rail and the first floating diffusion FD 522A as well as a second overflow transistor 542B coupled between the supply rail and the second floating diffusion FD 522B. In the various examples, the first and second overflow transistors 542A and 542B are switched in response to an overflow signal OF as shown.

Therefore, it is appreciated that photocurrent from photodiode 518 is either guided to the first and second storage nodes MEM 544A and 544B, or to the supply rail through the first and second reset transistors 524A and 524B through the first and second decoupling circuits 526A and 526B, or to the supply rail through the first and second overflow transistors 542A and 542B in pixel circuit 512C.

Figure 5D:
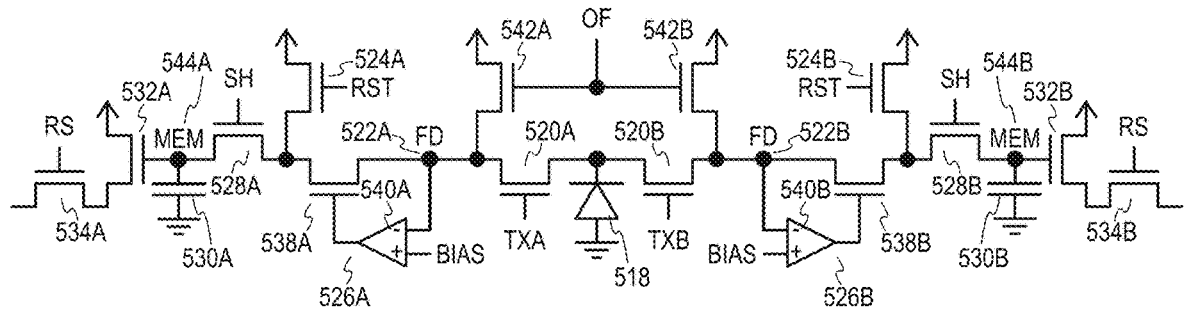
FIG. 5D is a schematic illustrating still another example of a time-of-flight pixel in accordance with the teachings of the present invention.

FIG. 5D is a schematic illustrating still another example of a time-of-flight pixel circuit 512D in accordance with the teachings of the present invention. It is appreciated the pixel circuit 512D of FIG. 5D may be another example of pixel circuit 512C as shown in FIG. 5C, or another example of pixel circuit 512B as shown in FIG. 5B, or another example of pixel circuit 512A as shown in FIG. 5A, or another example of one of the pixel circuits 112 included in pixel array 110 shown in FIG. 1, and that similarly named and numbered elements described above are coupled and function similarly below. It is further appreciated that the pixel circuit 512D of FIG. 5D shares many similarities with the example pixel circuit 512B described in detail in FIG. 5B.

For instance, as shown in the example depicted in FIG. 5D, pixel circuit 512D includes a photodiode 518 configured to photogenerate charge or photocurrent in response to incident light, which may for example be the reflected modulated light 108 that is reflected from an object 106 as described in FIG. 1. A first floating diffusion FD 522A is configured to store a first portion of charge photogenerated in the photodiode 518, such as for example charge Q1 or Q3, and a second floating diffusion FD 522B is configured to store a second portion of charge photogenerated in the photodiode 518, such as for example charge Q2 or Q4.

A first transfer transistor 520A is configured to transfer the first portion of charge from the photodiode 518 to the first floating diffusion FD 522A in response to a first phase signal TXA, and a second transfer transistor 520B is configured to transfer the second portion of charge from the photodiode 518 to the second floating diffusion FD 522B in response to a second phase signal TXB. A first storage node MEM 544A is configured to store the first portion of charge from the first floating diffusion FD 522A, and a second storage node MEM 544B is configured to store the second portion of charge from the second floating diffusion FD 522B.

Similar to the example pixel circuit 512B shown FIG. 5B, the first decoupling circuit 526A in example pixel circuit 512D of FIG. 5D is illustrated as including a first transistor 538A having a drain (e.g., output OUT of first decoupling circuit 526A) coupled to the first storage node MEM 544A and a source (e.g., input IN of first decoupling circuit 526A) coupled to the first floating diffusion FD 522A. In the depicted example, the first transistor 538A is coupled to the first storage node MEM 544A through the first sample and hold transistor 528A. Similarly, the second decoupling circuit 526B is illustrated as including a second transistor 538B having a drain (e.g., output OUT of second decoupling circuit 526B) coupled to the second storage node MEM 544B and a source (e.g., input IN of second decoupling circuit 526B) coupled to the second floating diffusion FD 522B. In the depicted example, the second transistor 538B is coupled to the second storage node MEM 544B through the second sample and hold transistor 528B.

One of the differences between the example pixel circuit 512D shown FIG. 5D and the example pixel circuit 512B shown in FIG. 5B is that in the example pixel circuit 512D shown FIG. 5D, the first decoupling circuit 526A further includes a first amplifier 540A, which is a differential amplifier or an operational amplifier having an inverting input coupled to the first floating diffusion FD 522A, a non-inverting input coupled to receive a bias voltage BIAS, and an output coupled to a gate of the first transistor 538A. Similarly, the second decoupling circuit 526B further includes a second amplifier 540B, which is a differential amplifier or an operational amplifier having an inverting input coupled to the second floating diffusion FD 522B, a non-inverting input coupled to receive the bias voltage BIAS, and an output coupled to a gate of the second transistor 538B.

As shown in the depicted example, the inverting input of the first amplifier 540A is also coupled to the source of first transistor 538A, and the inverting input of the second amplifier 540B is also coupled to the source of second transistor 538B. As such, a first feedback is provided to the first amplifier 540A through the source of first transistor 538A, and a second feedback is provided to the second amplifier 540A through the source of second transistor 538B. With the first feedback coupled to the inverting input of the first amplifier 540A and the second feedback coupled to inverting input of the second amplifier 540B, it is appreciated that the potential differences between the first floating diffusion FD 522A and the second floating diffusion FD 522B are reduced, which reduces the impact of parasitic leakage currents between the nodes.

It is further appreciated that with the first and second amplifiers 540A and 540B implemented with differential or operational amplifiers as shown in FIG. 5D, more robust control of the floating diffusion FD 522A and 522B potentials is enabled, but with the tradeoff of a larger footprint. As shown, the gates of the first and second transistors 538A and 538B are driven by the outputs of the first and second amplifiers 540A and 540B. With the inverting inputs of the first and second amplifiers 540A and 540B coupled to the corresponding first and second floating diffusions FD 522A and 522B and the sources of the first and second transistors 538A and 538B, negative feedback is established, while the non-inverting inputs of the first and second amplifiers 540A and 540B are coupled to the bias voltage BIAS.

Similar to the example pixel circuit 512B of FIG. 5B, the first storage node MEM 544A in the example pixel circuit 512D of FIG. 5D is coupled to a first capacitor 530A and a gate of a first source follower transistor 532A. A first row select transistor 534A is coupled to a source of the first source follower transistor 532A. In the various examples, the first row select transistor 534A is also coupled to a bit line, through which first output signal information may be read out from pixel circuit 512D. Similarly, the second storage node MEM 544B is coupled to a second capacitor 530B and a gate of a second source follower transistor 532B. A second row select transistor 534B is coupled to a source of the second source follower transistor 532B. In the various examples, the second row select transistor 534B is also coupled to a bit line, through which second output signal information may be read out from pixel circuit 512D.

As shown in the depicted example, pixel circuit 512D also includes a first reset transistor 524A coupled between a supply rail and the first decoupling circuit 526A. In particular, the example depicted in FIG. 5D shows first reset transistor 524A coupled to the drain of first transistor 538A. In various examples, first reset transistor 524A is configured to reset the first floating diffusion FD 522A as well the first storage node MEM 544A in response to a reset signal RST. In the example depicted in FIG. 5D, the first reset transistor 524A may be configured to reset the first storage node MEM 544A through first sample and hold transistor 528A, and the first floating diffusion FD 522A through the first transistor 538A.

Similarly, pixel circuit 512D also includes a second reset transistor 524B coupled between the supply rail and the second decoupling circuit 526B. In particular, the example depicted in FIG. 5D shows second reset transistor 524B coupled to the drain of second transistor 538B. In various examples, second reset transistor 524B is configured to reset the second floating diffusion FD 522B as well the second storage node MEM 544B in response to the reset signal RST. In the example depicted in FIG. 5D, the second reset transistor 524B is configured to reset the second storage node MEM 544B through second sample and hold transistor 528B, and the second floating diffusion FD 522B through the second transistor 538B.

In one example, during a reset mode a high potential bias voltage may be applied to the non-inverting inputs of the first and second amplifiers 540A and 540B to create a high output at the gates of the decoupling first and second transistors 538A and 538B resulting in operation in a triode mode to enable the reset of the first and second floating diffusions FD 522A and 522B through the first and second reset transistors 524A and 524B. During a decoupling period, the potential at the non-inverting inputs of the first and second amplifiers 540A and 540B may then be lowered to achieve saturation of the decoupling first and second transistors 538A and 538B.

Similar to pixel circuit 512B of FIG. 5B, pixel circuit 512D of FIG. 5D further includes a first overflow transistor 542A coupled between the supply rail and the first floating diffusion FD 522A as well as a second overflow transistor 542B coupled between the supply rail and the second floating diffusion FD 522B. In the various examples, the first and second overflow transistors 542A and 542B are switched in response to an overflow signal OF as shown.

Therefore, it is appreciated that photocurrent from photodiode 518 is either guided to the first and second storage nodes MEM 544A and 544B, or to the supply rail through the first and second reset transistors 524A and 524B through the first and second decoupling circuits 526A and 526B, or to the supply rail through the first and second overflow transistors 542A and 542B in pixel circuit 512D.

Figure 5E:
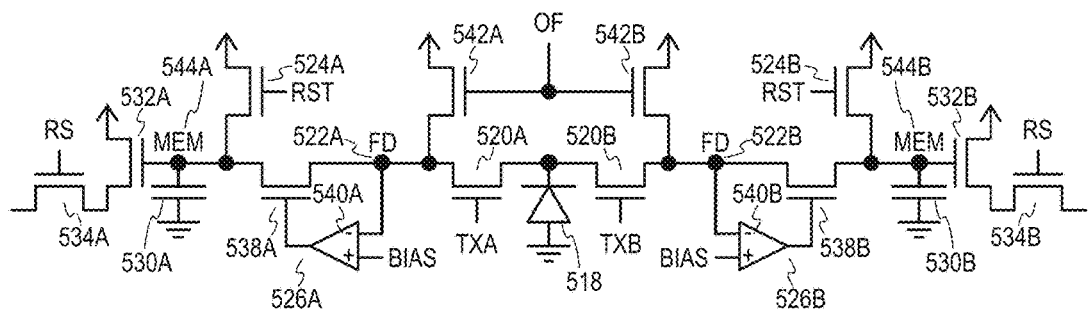
FIG. 5E is a schematic illustrating yet another example of a time-of-flight pixel in accordance with the teachings of the present invention.

FIG. 5E is a schematic illustrating yet another example of a time-of-flight pixel circuit in accordance with the teachings of the present invention. It is appreciated the pixel circuit 512E of FIG. 5E may be another example of pixel circuit 512D as shown in FIG. 5D, or another example of 512C as shown in FIG. 5C, or another example of pixel circuit 512B as shown in FIG. 5B, or another example of 512A as shown in FIG. 5A, or another example of one of the pixel circuits 112 included in pixel array 110 shown in FIG. 1, and that similarly named and numbered elements described above are coupled and function similarly below. It is further appreciated that the pixel circuit 512E of FIG. 5E shares many similarities with the example pixel circuit 512C described in detail in FIG. 5C.

For instance, as shown in the example depicted in FIG. 5E, pixel circuit 512E includes a photodiode 518 configured to photogenerate charge or photocurrent in response to incident light, which may for example be the reflected modulated light 108 that is reflected from an object 106 as described in FIG. 1. A first floating diffusion FD 522A is configured to store a first portion of charge photogenerated in the photodiode 518, such as for example charge Q1 or Q3, and a second floating diffusion FD 522B is configured to store a second portion of charge photogenerated in the photodiode 518, such as for example charge Q2 or Q4.

A first transfer transistor 520A is configured to transfer the first portion of charge from the photodiode 518 to the first floating diffusion FD 522A in response to a first phase signal TXA, and a second transfer transistor 520B is configured to transfer the second portion of charge from the photodiode 518 to the second floating diffusion FD 522B in response to a second phase signal TXB. A first storage node MEM 544A is configured to store the first portion of charge from the first floating diffusion FD 522A, and a second storage node MEM 544B is configured to store the second portion of charge from the second floating diffusion FD 522B.

Similar to the example pixel circuit 512C shown FIG. 5C, the first decoupling circuit 526A in example pixel circuit 512E of FIG. 5E is illustrated as including a first transistor 538A having a drain (e.g., output OUT of first decoupling circuit 526A) coupled to the first storage node MEM 544A and a source (e.g., input IN of first decoupling circuit 526A) coupled to the first floating diffusion FD 522A. Similarly, the second decoupling circuit 526B is illustrated as including a second transistor 538B having a drain (e.g., output OUT of second decoupling circuit 526B) coupled to the second storage node MEM 544B and a source (e.g., input IN of second decoupling circuit 526B) coupled to the second floating diffusion FD 522B.

One of the differences between the example pixel circuit 512E shown FIG. 5E and the example pixel circuit 512C shown in FIG. 5C is that in the example pixel circuit 512E shown FIG. 5E, the first decoupling circuit 526A further includes a first amplifier 540A, which is a differential amplifier or an operational amplifier having an inverting input coupled to the first floating diffusion FD 522A, a non-inverting input coupled to receive a bias voltage BIAS, and an output coupled to a gate of the first transistor 538A. Similarly, the second decoupling circuit 526B further includes a second amplifier 540B, which is a differential amplifier or an operational amplifier having an inverting input coupled to the second floating diffusion FD 522B, a non-inverting input coupled to receive the bias voltage BIAS, and an output coupled to a gate of the second transistor 538B.

As shown in the depicted example, the inverting input of the first amplifier 540A is also coupled to the source of first transistor 538A, and the inverting input of the second amplifier 540B is also coupled to the source of second transistor 538B. As such, a first feedback is provided to the first amplifier 540A through the source of first transistor 538A, and a second feedback is provided to the second amplifier 540A through the source of second transistor 538B. With the first feedback coupled to the inverting input of the first amplifier 540A and the second feedback coupled to inverting input of the second amplifier 540B, it is appreciated that the potential differences between the first floating diffusion FD 522A and the second floating diffusion FD 522B are reduced, which reduces the impact of parasitic leakage currents between the nodes.

It is further appreciated that with the first and second amplifiers 540A and 540B implemented with differential or operational amplifiers as shown in FIG. 5E, more robust control of the floating diffusion FD 522A and 522B potentials is enabled, but with the tradeoff of a larger footprint. As shown, the gates of the first and second transistors 538A and 538B are driven by the outputs of the first and second amplifiers 540A and 540B. With the inverting inputs of the first and second amplifiers 540A and 540B coupled to the corresponding first and second floating diffusions FD 522A and 522B and the sources of the first and second transistors 538A and 538B, negative feedback is established, while the non-inverting inputs of the first and second amplifiers 540A and 540B are coupled to the bias voltage BIAS.

Similar to the example pixel circuit 512C of FIG. 5C, the first storage node MEM 544A in the example pixel circuit 512E of FIG. 5E is coupled to a first capacitor 530A and a gate of a first source follower transistor 532A. A first row select transistor 534A is coupled to a source of the first source follower transistor 532A. In the various examples, the first row select transistor 534A is also coupled to a bit line, through which first output signal information may be read out from pixel circuit 512E. Similarly, the second storage node MEM 544B is coupled to a second capacitor 530B and a gate of a second source follower transistor 532B. A second row select transistor 534B is coupled to a source of the second source follower transistor 532B. In the various examples, the second row select transistor 534B is also coupled to a bit line, through which second output signal information may be read out from pixel circuit 512E.

As shown in the depicted example, pixel circuit 512E also includes a first reset transistor 524A coupled between a supply rail and the first decoupling circuit 526A. In particular, the example depicted in FIG. 5E shows first reset transistor 524A coupled to the drain of first transistor 538A. Similarly, pixel circuit 512E also includes a second reset transistor 524B coupled between the supply rail and the second decoupling circuit 526B. In particular, the example depicted in FIG. 5E shows second reset transistor 524B coupled to the drain of second transistor 538B.

Similar to the example pixel circuit 512C of FIG. 5C, the example pixel circuit 512E of FIG. 5E does not include first and second sample and hold circuits 528A and 528B coupled between the outputs of the first and second decoupling circuits 526A and 526B and the first and second storage nodes MEM 544A and 544B.

In various examples, the first reset transistor 524A is configured to reset the first floating diffusion FD 522A as well the first storage node MEM 544A in response to a reset signal RST, and the second reset transistor 524B is configured to reset the second floating diffusion FD 522B as well the second storage node MEM 544B in response to the reset signal RST. In the example depicted in FIG. 5E, the first reset transistor 524A may be configured to reset the first floating diffusion FD 522A through the first transistor 538A, and the second reset transistor 524B is configured to reset the second floating diffusion FD 522B through the second transistor 538B.

In one example, during a reset mode a high potential bias voltage may be applied to the non-inverting inputs of the first and second amplifiers 540A and 540B to create a high output at the gates of the decoupling first and second transistors 538A and 538B resulting in operation in a triode mode to enable the reset of the first and second floating diffusions FD 522A and 522B through the first and second reset transistors 524A and 524B. During a decoupling period, the potential at the non-inverting inputs of the first and second amplifiers 540A and 540B may then be lowered to achieve saturation of the decoupling first and second transistors 538A and 538B.

Similar to pixel circuit 512C of FIG. 5C, pixel circuit 512E of FIG. 5E further includes a first overflow transistor 542A coupled between the supply rail and the first floating diffusion FD 522A as well as a second overflow transistor 542B coupled between the supply rail and the second floating diffusion FD 522B. In the various examples, the first and second overflow transistors 542A and 542B are switched in response to an overflow signal OF as shown.

Therefore, it is appreciated that photocurrent from photodiode 518 is either guided to the first and second storage nodes MEM 544A and 544B, or to the supply rail through the first and second reset transistors 524A and 524B through the first and second decoupling circuits 526A and 526B, or to the supply rail through the first and second overflow transistors 542A and 542B in pixel circuit 512E.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A pixel circuit, comprising:
a photodiode configured to photogenerate charge in response to reflected modulated light incident upon the photodiode;
a floating diffusion configured to store a portion of the charge photogenerated in the photodiode;
a transfer transistor coupling the photodiode to the floating diffusion and configured to transfer the portion of the charge from the photodiode to the floating diffusion in response to a phase signal;
a storage node configured to store the portion of the charge from the floating diffusion;
a transistor having an input node and an output node, and coupling the floating diffusion to the storage node;
an amplifier having (i) an input coupled to the floating diffusion and to the input node of the transistor and (ii) an output coupled to a gate of the transistor; and
a reset transistor coupled between a supply rail and the input node of the transistor, wherein the reset transistor is configured to (a) reset the floating diffusion in response to a reset signal and (b) reset the storage node via the output node and the input node of the transistor.

2. The pixel circuit of claim 1, wherein:
the input node of the transistor is a source of the transistor;
the output node of the transistor is a drain of the transistor;
the floating diffusion is coupled to the drain of the transistor via the source of the transistor; and
the storage node is coupled to the source of the transistor via the drain of the transistor.

3. The pixel circuit of claim 1, wherein the amplifier has a negative gain.

4. The pixel circuit of claim 1, wherein:
the amplifier comprises an operational amplifier;
the output of the amplifier is an output of the operational amplifier;
the input of the amplifier is an inverting input of the operational amplifier; and
a non-inverting input of the operational amplifier is coupled to a bias voltage.

5. The pixel circuit of claim 1, further comprising a sample and hold transistor coupled between the storage node and the output node of the transistor.

6. The pixel circuit of claim 5, wherein the reset transistor is configured to reset the storage node through the sample and hold transistor.

7. A light sensing system, comprising:
a light source configured to emit modulated light to an object;
a pixel array optically coupled to sense reflected modulated light from the object,
wherein the pixel array includes a plurality of pixel circuits, wherein each one of the plurality of pixel circuits comprises:
a photodiode configured to photogenerate charge in response to reflected modulated light incident upon the photodiode,
a floating diffusion configured to store a portion of the charge photogenerated in the photodiode,
a transfer transistor coupling the photodiode to the floating diffusion and configured to transfer the portion of the charge from the photodiode to the floating diffusion in response to a phase signal,
a storage node configured to store the portion of the charge from the floating diffusion,
a transistor coupling the floating diffusion to the storage node,
an amplifier having an input and an output, wherein the input of the amplifier is coupled to an input node of the transistor and to the floating diffusion, and
wherein the output of the amplifier is coupled to a gate of the transistor, and
a reset transistor coupled between a supply rail and the input node of the transistor, wherein the reset transistor is configured to (a) reset the floating diffusion in response to a reset signal and (b) reset the storage node via an output node and the input node of the transistor; and
a control circuit coupled to control the light source and the pixel array to sense the reflected modulated light from the object to the pixel array.

8. The light sensing system of claim 7, wherein each one of the plurality of pixel circuits further comprises:
a second floating diffusion configured to store a second portion of the charge photogenerated in the photodiode;
a second transfer transistor configured to transfer the second portion of the charge from the photodiode to the second floating diffusion in response to a second phase signal,
wherein the second phase signal is out of phase from the phase signal;
a second storage node configured to store the second portion of the charge from the second floating diffusion;
a second transistor having an input node and an output node, and coupling the second floating diffusion to the second storage node; and
a second amplifier having (i) an input coupled to the second floating diffusion and to the input node of the second transistor and (ii) an output coupled to a gate of the second transistor.

9. The light sensing system of claim 7, wherein:
the output node of the transistor includes a drain of the transistor; and
the input node of the transistor includes a source of the transistor.

10. The light sensing system of claim 9, wherein:
the storage node is coupled to the source of the transistor via the drain of the transistor;
and the floating diffusion is coupled to the drain of the transistor via the source of the transistor.

11. The light sensing system of claim 7, wherein the amplifier has a negative gain.

12. The light sensing system of claim 7, wherein:
the amplifier comprises an operational amplifier;
the output of the amplifier is an output of the operational amplifier;

the input of the amplifier is an inverting input of the operational amplifier; and a non-inverting input of the operational amplifier is coupled to a bias voltage.

13. The light sensing system of claim 7, further comprising a sample and hold transistor coupled between the storage node and an output node of the transistor.

14. The light sensing system of claim 13, wherein the reset transistor is further configured to reset the storage node through the sample and hold transistor.

15. The light sensing system of claim 7, wherein the control circuit is configured to sense a time-of-flight of the emitted modulated light from the light source to the object and the reflected modulated light from the object to the pixel array by detecting a phase difference between the emitted modulated light and the reflected modulated light sensed by the pixel array.

16. The pixel circuit of claim 1, wherein the input node of the transistor includes a source of the transistor.

17. The pixel circuit of claim 16, wherein the floating diffusion is coupled to the source of the transistor such that the floating diffusion is coupled to the output node of the transistor via the source of the transistor.

18. The pixel circuit of claim 1, wherein the output node of the transistor includes a drain of the transistor.

19. The pixel circuit of claim 18, wherein the storage node is coupled to the drain of the transistor such that the storage node is coupled to the input node of the transistor via the drain of the transistor.

20. The pixel circuit of claim 1, wherein the reset transistor is further coupled between the supply rail and the storage node.

21. The pixel circuit of claim 1, wherein:

the floating diffusion is a first floating diffusion, the portion of the charge is a first portion of the charge, the transfer transistor is a first transfer transistor, the phase signal is a first phase signal, the storage node is a first storage node, the transistor is a first transistor, and the amplifier is a first amplifier; and the pixel circuit further comprises:

a second floating diffusion different from the first floating diffusion and configured to store a second portion of the charge different from the first portion, a second transfer transistor different from the first transfer transistor and coupling the photodiode to the second floating diffusion, wherein the second transfer transistor is configured to transfer the second portion of the charge from the photodiode to the second floating diffusion in response to a second phase signal different from the first phase signal, a second storage node different from the first storage node and configured to store the second portion of the charge from the second floating diffusion, a second transistor different from the first transistor and having an input node and an output node, wherein the second transistor couples the second floating diffusion to the second storage node, and a second amplifier different from the first amplifier and having (i) an input coupled to the second floating diffusion and to the input node of the second transistor and (ii) an output coupled to a gate of the second transistor.

22. The pixel circuit of claim 21, wherein:

the reset transistor is a first reset transistor;

the pixel circuit further comprises a second reset transistor coupled between the supply rail and the input node of the second transistor; and the second reset transistor is configured to reset the second floating diffusion in response to the reset signal.

23. The pixel circuit of claim 22, wherein the second reset transistor is further configured to reset the second storage node via the output node and the input node of the second transistor.

24. The pixel circuit of claim 21, wherein:

the reset transistor is a first reset transistor; and the pixel circuit further comprises a second reset transistor configured to reset the storage node via the output node and the input node of the second transistor.

25. The light sensing system of claim 8, wherein:

each one of the plurality of pixel circuits further comprises a second reset transistor coupled between the supply rail and the input node of the second transistor; and the second reset transistor is configured to reset the second floating diffusion in response to the reset signal.

26. The light sensing system of claim 25, wherein the second reset transistor is further configured to reset the second storage node via the output node and the input node of the second transistor.

27. The light sensing system of claim 8, wherein each one of the plurality of pixel circuits further comprises a second reset transistor configured to reset the storage node via the output node and the input node of the second transistor.

* * * * *